US012668427B2

(12) United States Patent
Ueda et al.

(10) Patent No.: US 12,668,427 B2
(45) Date of Patent: **\*Jun. 30, 2026**

(54) PICKING SYSTEM

(71) Applicant: Daifuku Co., Ltd., Osaka (JP)

(72) Inventors: Yuichi Ueda, Hinocho (JP); Masaya Miyamoto, Tokyo (JP); Masashige Iwata, Hinocho (JP); Kazunari Kimura, Hinocho (JP)

(73) Assignee: Daifuku Co., Ltd., Osaka (JP)

( \* ) Notice: Subject to any disclaimer, the term of this patent is extended or adjusted under 35 U.S.C. 154(b) by 384 days.

This patent is subject to a terminal disclaimer.

(21) Appl. No.: 18/375,229

(22) Filed: Sep. 29, 2023

(65) Prior Publication Data

US 2024/0025646 A1     Jan. 25, 2024

Related U.S. Application Data

(63) Continuation of application No. 17/053,087, filed as application No. PCT/JP2019/016608 on Apr. 18, 2019, now Pat. No. 11,807,458.

(30) Foreign Application Priority Data

May 23, 2018     (JP) ................................. 2018-099126

(51) Int. Cl.
*B65G 1/137*     (2006.01)
*B65G 1/04*     (2006.01)
*B65G 1/06*     (2006.01)

(52) U.S. Cl.
CPC ......... *B65G 1/1375* (2013.01); *B65G 1/0407* (2013.01)

(58) Field of Classification Search
CPC .. B65G 1/1375; B65G 1/0407; B65G 1/1378; B65G 1/065; B65G 1/0492;
(Continued)

(56) References Cited

U.S. PATENT DOCUMENTS 4,007,843 A * 2/1977 Lubbers ............... B65G 1/0414
414/273
6,315,513 B1 * 11/2001 Harukawa .............. B65G 61/00
414/626
(Continued)

FOREIGN PATENT DOCUMENTS

JP          624506 A     2/1994
JP          7206112 A     8/1995
(Continued)

*Primary Examiner* — Jaime Figueroa
(74) *Attorney, Agent, or Firm* — The Webb Law Firm

(57)     ABSTRACT

A picking system is realized that can efficiently perform operations from collection to delivery of articles in a limited space. A picking system (1) includes: a multi-row sorting device (2) configured to sort the article into one of the plurality of rows of exits (21) and discharge the sorted article; a container supporting device (3) capable of supporting an accommodating container (B) on a plurality of rows of container supporting portions (32) until an article group that is a set of articles for the order is collected; and a transport device (4) configured to unload the accommodating container (B) in which the article is accommodated from the container supporting portion (32), and load an empty accommodating container (B) to the container supporting portion (32).

15 Claims, 15 Drawing Sheets

(58) Field of Classification Search
CPC .. B65G 1/0428; B65G 1/1371; B65G 1/1373;
B65G 1/0485; B65G 1/06
USPC ........................................................ 700/213
See application file for complete search history.

(56) References Cited

U.S. PATENT DOCUMENTS

| | | | | |
|---|---|---|---|---|
| 7,686,171 | B1 * | 3/2010 | Shakes | B07C 7/005 |
| | | | | 209/583 |
| 9,545,724 | B2 * | 1/2017 | Bonora | H01L 21/67766 |
| 9,592,960 | B2 * | 3/2017 | Schäfer | B65G 1/1376 |
| 10,092,929 | B2 * | 10/2018 | Bonora | B25J 15/0028 |
| 11,142,399 | B2 * | 10/2021 | Ahmann | G05D 1/0225 |
| 2002/0021954 | A1 * | 2/2002 | Winkler | B65G 1/1375 |
| | | | | 414/273 |
| 2002/0117429 | A1 * | 8/2002 | Takizawa | B65G 1/1378 |
| | | | | 209/583 |
| 2002/0134711 | A1 * | 9/2002 | Takizawa | B65G 1/1375 |
| | | | | 209/583 |
| 2003/0106771 | A1 * | 6/2003 | Takizawa | B65G 1/137 |
| | | | | 198/436 |

| | | | | |
|---|---|---|---|---|
| 2005/0043850 | A1 * | 2/2005 | Stevens | B65G 1/1378 |
| | | | | 700/213 |
| 2006/0182550 | A1 | 8/2006 | Lee | |
| 2009/0324378 | A1 * | 12/2009 | Schafer | B65G 1/1378 |
| | | | | 414/281 |
| 2010/0036675 | A1 * | 2/2010 | Schafer | B65G 1/1376 |
| | | | | 211/11 |
| 2013/0129469 | A1 | 5/2013 | Salichs et al. | |
| 2014/0056672 | A1 * | 2/2014 | Mathys | B65G 1/0407 |
| | | | | 414/277 |
| 2017/0100750 | A1 * | 4/2017 | Bonora | B07C 5/00 |
| 2017/0137221 | A1 | 5/2017 | Koide | |
| 2018/0361433 | A1 * | 12/2018 | Bonora | H01L 21/67766 |

FOREIGN PATENT DOCUMENTS

| | | | |
|---|---|---|---|
| JP | 2004189417 | A | 7/2004 |
| JP | 201241128 | A | 3/2012 |
| JP | 2013136447 | A | 7/2013 |
| JP | 2015199562 | A | 11/2015 |
| JP | 2017165513 | A | 9/2017 |

* cited by examiner

PICKING SYSTEM

CROSS-REFERENCE TO RELATED APPLICATIONS

This application is a continuation of U.S. patent application Ser. No. 17/053,087, filed Nov. 5, 2020, which is the United States national phase of International Application No. PCT/JP2019/016608 filed Apr. 18, 2019, and claims priority to Japanese Patent Application No. 2018-099126 filed May 23, 2018, the disclosures of which are hereby incorporated by reference in their entirety.

BACKGROUND OF THE INVENTION

Field of the Invention

The present invention relates to a picking system.

Description of Related Art

For example, an enterprise that conducts electronic commerce transactions may store various types of articles in a distribution warehouse, and, upon receiving an order, directly send the purchased article from the distribution warehouse to the purchaser. In such a case, a picking system that collects and delivers the required article from among a plurality of stored articles is used. An example of such a picking system is disclosed in JP 2004-189417A (Patent Document 1).

The picking system includes, as a sorting device, many carriages 122 each including a sorting tray 121 that can be tilted in a direction orthogonal to the traveling direction. After each carriage 122 has been caused to travel to a desired sorting position, the sorting tray 121 is tilted to discharge the article, and the discharged article is received with a collecting box B, thus performing sorting.

In the picking system disclosed in Patent Document 1, if the number of orders to be collectively processed at a time increases, it is necessary to extend the movable range of the sorting device, and provide an additional collecting box B in the extended area. This results in poor space efficiency. Furthermore, Patent Document 1 contains no description of unloading of the collecting box B in which the sorted articles are accommodated, and a subsequent process, and no particular consideration has been given for efficient unloading of the sorted articles.

SUMMARY OF THE INVENTION

Realization of a picking system that can efficiently perform operations from collection to delivery of articles in a limited space is in demand.

A picking system according to the present disclosure relates to a picking system that collects and delivers a required article from among a plurality of stored articles, including:

a multi-row sorting device that includes a plurality of rows of exits at different heights in a vertical direction, and is configured to sort the article into one of the plurality of rows of exits based on an order, and discharge the sorted article;

a container supporting device that includes a plurality of container supporting portions provided in a plurality of rows respectively corresponding to the plurality of rows of exits, and is capable of supporting an accommodating container that receives and accommodates the article discharged from the exit on the corresponding container supporting portion until an article group that is a set of articles for the order is collected; and a transport device configured to unload the accommodating container in which the article is accommodated from the container supporting portion, and load an empty accommodating container to the container supporting portion.

With this configuration, since the sorting device that sorts an article based on an order is a multi-row sorting device having a plurality of rows of exits, it is possible to increase the number of orders that can be collectively processed at a time, using the rows at different heights in the vertical direction. That is, the process efficiency for sorting can be increased, without expanding the planar installation space for the sorting device. Also, in this configuration, the article discharged from the exit is received in the accommodating container supported on the container supporting portion of the container supporting device until an article group for each corresponding order is collected, and then automatically unloaded by the transport device. As a result of the unloading process, there is no accommodating container on each container supporting portion, and thus an empty accommodating container is automatically loaded by the transport device to compensate for this absence. Accordingly, since unloading of the accommodating container in which the article group for each order is accommodated, and loading of an empty accommodating container are automatically performed by the transport device, it is possible to efficiently perform unloading after sorting, and prepare for the next unloading process. With the above-described measures, it is possible to realize a picking system that can efficiently perform operations from collection to delivery of articles in a limited space.

Further features and advantages of the technique according to the present disclosure will become apparent from the following description of illustrative and non-limiting embodiments with reference to the drawings.

BRIEF DESCRIPTION OF THE DRAWINGS

FIG. 5 is a diagram of a model illustrating how articles are supplied and distributed.

FIG. 14 is a time chart illustrating a flow of the processes of the picking system according to the second embodiment.

DETAILED DESCRIPTION OF THE PREFERRED EMBODIMENTS

First Embodiment

A first embodiment of a picking system will be described with reference to the drawings. A picking system 1 according to the present embodiment is provided, for example, in a distribution facility owned by an enterprise that conducts electronic commerce transactions, and is used to collect (pick) and deliver a required article A from among a plurality of stored articles A.

Figure 1:
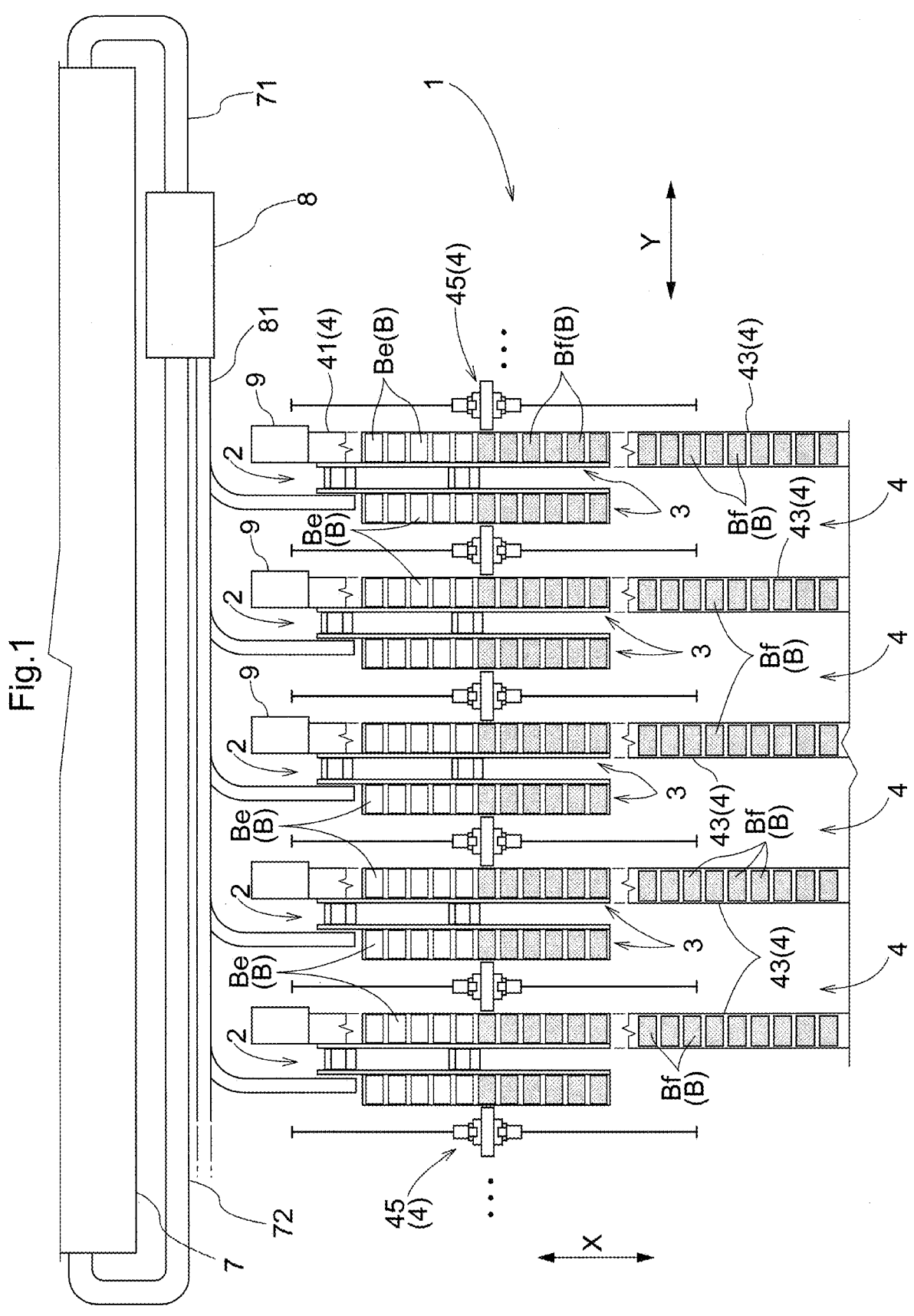
FIG. 1 is a schematic plan view of a picking system.

As shown in FIG. 1, the picking system 1 includes, as its main components, a multi-row sorting device 2, a container supporting device 3 arranged next to the multi-row sorting device 2, a transport device 4, and an automatic warehouse 7. In addition, the picking system 1 of the present embodiment includes an article unpacking portion 8 and an empty container supply device 9.

In the following description, the direction in which the multi-row sorting device 2 and the container supporting device 3 are arranged side by side is referred to as an "arrangement direction Y". Also, the direction that intersects with a vertical direction Z when viewed in an arrangement direction view along the arrangement direction Y, in which the multi-row sorting device 2 and the container supporting device 3 are arranged side by side, is referred to as a "width direction X". Note that in the present specification, terminology relating to the sizes of the components, the arrangement directions thereof, the arrangement positions thereof, and the like is used as a concept that also includes a state in which differences occur due to an error (an error within an acceptable range in manufacturing).

The automatic warehouse 7 is configured to store a plurality of articles A, and automatically unload specific articles A when necessary. The articles A are housed and stored by type of articles in original package containers.

The automatic warehouse 7 includes a plurality of rows of storage racks that store the original package containers in which the articles A are accommodated, and an unloading device that unloads, from the storage racks, an original package container in which a specific article A is accommodated. For example, the unloading device may be a plurality of rows transport carriages provided corresponding to the respective rows of storage racks, or stacker cranes, or the like.

An original package supply device 71 is connected to the automatic warehouse 5. The original package supply device 71 is a device for supplying original package containers unloaded from the automatic warehouse 7 toward the multi-row sorting device 2 side.

For example, the original package supply device 71 may be a conveyor, a transport carriage, a ceiling guided vehicle, or the like.

The article unpacking portion 8 is connected to the original package supply device 71. The article unpacking portion 8 is a portion for taking articles A out of the original package containers on a piece-by-piece basis, and supplying the articles A to the multi-row sorting device 2 side. In the article unpacking portion 8, an operator may manually perform the taking-out operation, or a robot arm or the like may automatically perform the taking-out operation.

An original package returning device 72 and an article supply device 81 are connected to the article unpacking portion 8. The original package returning device 72 is a device for allowing an original package container from which a required number of articles A have been taken out in the article unpacking portion 8 to be returned to and stored again in the automatic warehouse 7. For example, the original package returning device 72 may be a conveyor, a transport carriage, a ceiling guided vehicle, or the like. The article supply device 81 is a device for sequentially supplying, to the multi-row sorting device 2 side, the articles A taken out from the original package containers in the article unpacking portion 8. For example, the article supply device 81 may be a conveyor, a transport carriage, a ceiling guided vehicle, or the like.

The transport path of the article supply device 81 is branched into a plurality of paths (specifically, the number of paths that corresponds to the number of multi-row sorting devices 2) on the downstream side in the transport direction. Also, each of the plurality of branched paths extends to the corresponding multi-row sorting device 2. In this manner, a plurality of multi-row sorting devices 2 are connected in common to the automatic warehouse 7 via the article unpacking portion 8, and required articles A are supplied to the multi-row sorting devices 2 on a piece-by-piece basis. Note that the required articles A refer to articles of the type specified by an order (picking order) indicating the type and the number of articles A to be delivered (the articles A may be articles of a single type, or may be articles of a combination of a plurality of types).

The picking system 1 of the present embodiment includes a plurality of multi-row sorting devices 2. The multi-row sorting devices 2 are disposed parallel to each other with a predetermined interval therebetween in an arrangement direction Y.

Figure 2:
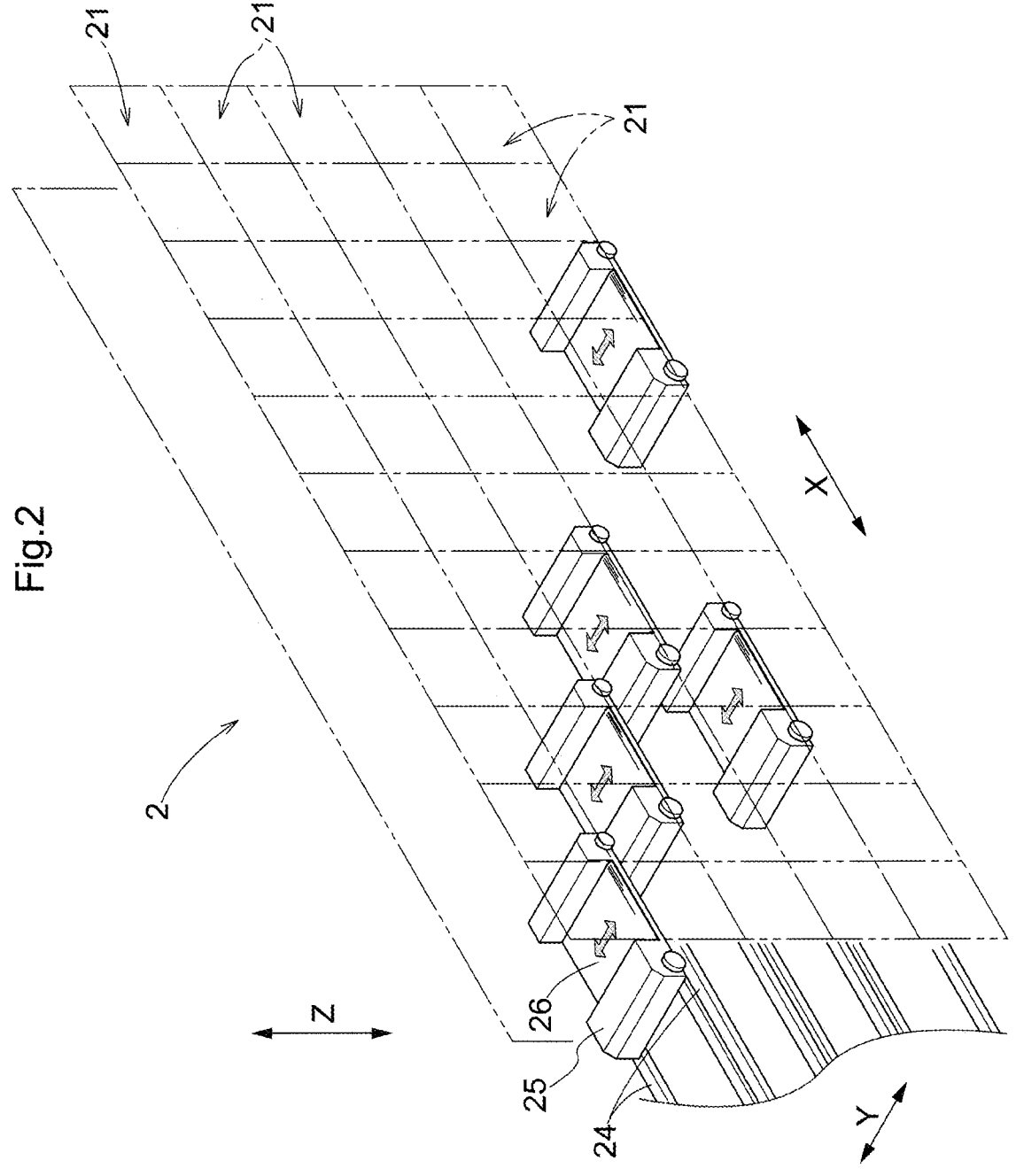
FIG. 2 is a perspective view of a multi-row sorting device.

As shown in FIG. 2, each multi-row sorting device 2 includes a plurality of rows of exits 21 at different heights in the vertical direction Z. In addition, the multi-row sorting device 2 includes a plurality of columns of exits 21 at different positions in the width direction X. That is, the multi-row sorting device 2 includes a plurality of exits 21 arranged in an orthogonal grid arrangement composed of a plurality of rows and a plurality of columns. Here, for example, when the multi-row sorting device 2 is provided with a housing that surrounds its outer periphery, the exits 21 may be a plurality of openings (window portions) formed in the housing. When the multi-row sorting device 2 is not particularly provided with such a housing, the exits 21 may be virtual openings that are set at positions facing the individual container supporting portions 32 of the storage devices 3, which will be described below.

The number of rows of exits 21 is not particularly limited, so long as the number is two or more. As the number of rows is increased, the number of orders that can be collectively processed at a time increases as will be described below, which is preferable. However, if the number of rows is excessively increased, there are the possibilities that the initial cost may increase and the throughput capacity may be excessive.

It is preferable that each multi-row sorting device 2 is a multi-row sorting device having, for example, about 5 to 30 rows of exits 21. The number of columns of exits 21 is not particularly limited, so long as the number is two or more, and may be about 5 to 40, for example.

Each multi-row sorting device 2 sorts, based on an order, an article A into one of a plurality of exits 21 composed of a plurality of rows and a plurality of columns, and discharges the sorted article A. While a conventionally well-known sorting device is composed of a single row and merely performs planar sorting (a single-row sorting device), the multi-row sorting device 2 performs three-dimensional sorting by using the rows at different heights in the vertical direction Z. Therefore, the number of orders that can be collectively processed at a time can be increased according to the number of rows of the multi-row sorting device 2. Also, the process efficiency for sorting can be increased without expanding the planar installation space for the sorting device.

The multi-row sorting device 2 includes, on each of two sides in the arrangement direction Y, a plurality of exits 21 composed of a plurality of rows and a plurality of columns. The multi-row sorting device 2 sorts, based on an order, an article A into one of the plurality of exits 21 on both sides in the arrangement direction Y, and discharges the sorted article. Such a configuration is also advantageous in that the number of orders that can be collectively processed at a time can be doubled.

As shown in FIG. 2, the multi-row sorting device 2 of the present embodiment includes a plurality of transport carriages 25 (specifically, the number of transport carriages 25 that corresponds to the number of rows of exits 21). The multi-row sorting device 2 includes travel rails 24 laid for each of the plurality of rows of exits 21. The travel rails 24 of each row are laid along the width direction X. Each transport carriage 25 is configured to reciprocate on the travel rails 24 of the corresponding row along these travel rails 24 (along the width direction X). The transport carriage 25 of each row is configured to be capable of stopping at positions corresponding to the plurality of columns of exits 21.

A discharge conveyor 26 on which an article A is to be placed is fixed to each transport carriage 25. The discharge conveyor 26 is driven in a direction (the arrangement direction Y) orthogonal to the travel rails 24. The discharge conveyor 26 can be driven in both forward and reverse directions. When the discharge conveyor 26 is driven in the forward direction, the article A is discharged from an exit 21 located on one side in the arrangement direction Y. When the discharge conveyor 26 is driven in the reverse direction, the article A is discharged from an exit 21 located on the other side in the arrangement direction Y. In this manner, the multi-row sorting device 2 can discharge articles A from exits 21 located on both sides in the arrangement direction Y.

Figure 3:
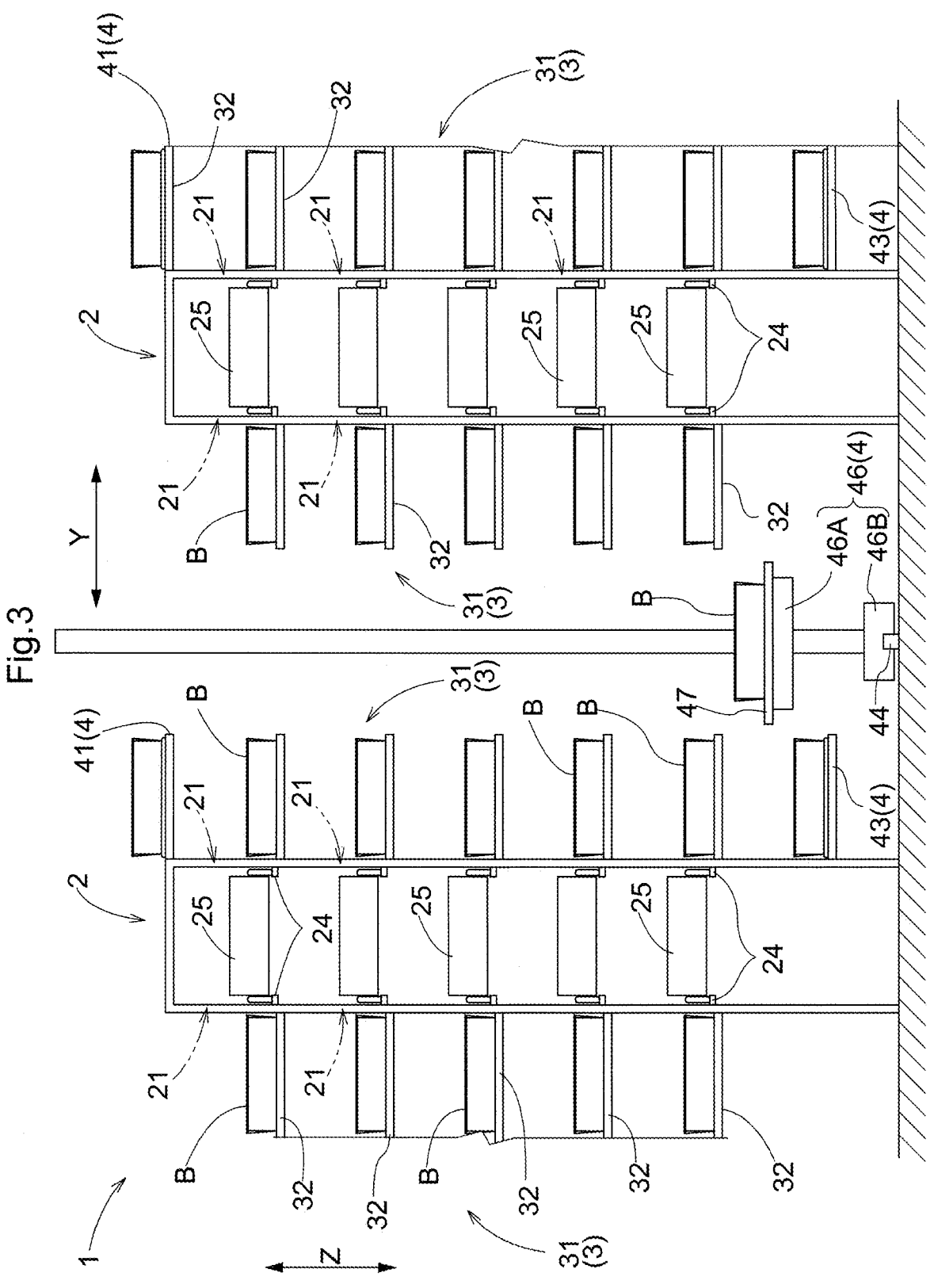
FIG. 3 is a side view of the picking system.

The container supporting device 3 includes a plurality of container supporting portions 32, and can support accommodating containers B on the respective container supporting portions 32. As shown in FIG. 3, the plurality of container supporting portions 32 are provided in a plurality of rows corresponding to the plurality of rows of exits 21 of the multi-row sorting device 2. Also, the plurality of container supporting portions 32 are provided in a plurality of columns corresponding to the plurality of columns of exits 21 of the multi-row sorting device 2. That is, the container supporting device 3 includes a plurality of container supporting portions 32 arranged in an orthogonal grid arrangement composed of a plurality of rows and a plurality of columns. The container supporting device 3 is disposed on each of the two sides of one multi-row sorting device 2 in the arrangement direction Y.

The container supporting device 3 of the present embodiment is a container storage rack 31 fixed to the floor face.

In this case, each container supporting portion 32 is a shelf board provided on the container storage rack 31.

The accommodating container B can be placed and supported on the container supporting portion 32 composed of the shelf board. Accordingly, the container supporting device 3 is not necessarily a device having a drive part but may be static equipment. Note that, for example, an upwardly open basket-shaped body (basket) or the like may be used as the accommodating container B.

The container supporting device 3 is arranged so that the accommodating containers B supported on the container supporting portions 32 are adjacent to the exits 21 of the multi-row sorting device 2 in the arrangement direction Y. Accordingly, when the multi-row sorting device 2 discharges a sorted article A from the corresponding exit 21, the article A can be received by the accommodating container B supported on the corresponding container supporting portion 32. The accommodating container B supported on the container supporting portion 32 is kept supported on the container supporting portion 32 at least until an article group G, which is a set of articles A for the corresponding order, is collected. In the present embodiment, the accommodating containers B are kept supported on the corresponding container supporting portion 32 until the article groups G that correspond to all of orders to be collectively processed at a time are collected in the corresponding accommodating containers B. Also, each accommodating container B receives an article A discharged from the exit 21 of the multi-row sorting device 2, and accommodates it.

In the present embodiment, it is assumed that, in one batch, the same number of orders are collectively processed as the number (the number of rows×the number of columns) of exits 21 of one multi-row sorting device 2 that are located on one side in the arrangement direction Y. For example, each accommodating container B is kept supported on the container supporting portion 32 until the article groups G for the corresponding orders are collected in all of the accommodating containers B located on one side of one multi-row sorting device 2. After the article groups G for the corresponding orders have been collected in all of the accommodating containers B, the accommodating containers B can be transferred from the container supporting portions 32.

The transport device 4 receives an article A discharged from the multi-row sorting device 2 with the accommodating container B supported on the container supporting portion 32, unloads the received accommodating container B, and loads an empty accommodating container B on that container supporting portion 32.

Note that in the following, empty accommodating containers B are referred to as "empty accommodating containers Be", and accommodating containers B in which articles A (article group G) are accommodated are referred to as "full accommodating containers Bf". As shown in FIG. 3 and the like, the transport device 4 is provided on each of the two sides of one multi-row sorting device 2 in the arrangement direction Y.

As shown in FIGS. 1 and 3, the transport device 4 includes a loading conveyor 41, an unloading conveyor 43, and a stacker crane 45. One multi-row sorting device 2 includes one loading conveyor 41, one unloading conveyor 43, and one stacker crane 45.

The loading conveyor 41 is provided on the downstream side of the empty container supply device 9 (see FIG. 1). The loading conveyor 41 loads empty accommodating containers Be supplied from the empty container supply device 9.

The loading conveyor 41 extends, at least in its portion on the downstream side, straight along the multi-row sorting device 2 (in the width direction X). Also, the loading conveyor 41 is arranged above the container supporting device 3 (container storage rack 31) at a position at which it overlaps the container supporting device 3 when viewed in the vertical direction Z. The loading conveyor 41 is provided on only one side (right side in the example of FIG. 3) of the multi-row sorting device 2 in the arrangement direction Y, and is not provided on the other side (left side in the example of FIG. 3).

The unloading conveyor 43 unloads full accommodating containers Bf toward a shipping area side. The unloading conveyor 43 extends, at least in its portion on the upstream side, straight along the multi-row sorting device 2 (in the width direction X). Also, the unloading conveyor 43 is arranged below the container supporting device 3 (container storage rack 31) at a position at which it overlaps the container supporting device 3 when viewed in the vertical direction Z.

The unloading conveyor 43 is also provided on only one side (right side in the example of FIG. 3, which is the same side as in the case of the loading conveyor 41) of the multi-row sorting device 2 in the arrangement direction Y, and is not provided on the other side (left side in the example of FIG. 3).

The stacker crane 45 includes a moving device 46 and a transfer machine 47. The moving device 46 includes a travel carriage 46A that reciprocates along a travel rail 44 installed on the floor face, and an elevating platform 46B that moves up and down along a pair of masts provided upright on the travel carriage 46A. The transfer machine 47 is installed on the elevating platform 46B. As a result of the travel carriage 46A reciprocating between columns of the container supporting portions 32, and the elevating platform 46B moving up and down between rows of container supporting portions 32, the moving device 46 moves the transfer machine 47 between a plurality of container supporting portions 32. The transfer machine 47 receives an accommodating container B (for example, a full accommodating container Bf) from a container supporting portion 32 of the container supporting device 3, and gives an accommodating container B (for example, an empty accommodating container Be) to the container supporting portion 32. The type of the transfer machine 47 is not particularly limited, but a hook type transfer machine is preferable because the height pitch of the container supporting portions 32 of the container supporting device 3 can be reduced.

As shown in FIGS. 1 and 3, the stacker crane 45 is arranged adjacent to the container supporting devices 3 in the arrangement direction Y. The container supporting device 3, the multi-row sorting device 2, the container supporting device 3, and the stacker crane 45 are arranged in the arrangement direction Y in the stated order. Also, assume that they are defined as one unit, a plurality of units are arranged adjacent to each other in the arrangement direction Y. The picking system 1 of the present embodiment has a configuration in which the stacker crane 45 that belongs to one unit is shared by the other unit that is adjacent to this stacker crane 45 in the arrangement direction Y. That is, a stacker crane 45 located between two multi-row sorting devices 2 that are adjacent to each other in the arrangement direction Y is configured to perform both unloading of a full accommodating container Bf from one multi-row sorting device 2 side, and unloading of a full accommodating container Bf from the other multi-row sorting device 2 side, at different timings. Similarly, the stacker crane 45 is configured to perform both loading of an empty accommodating container Be to one multi-row sorting device 2 side, and loading of an empty accommodating container Be to the other multi-row sorting device 2 side, at different timings. The details in this regard will be described later.

Figure 4:
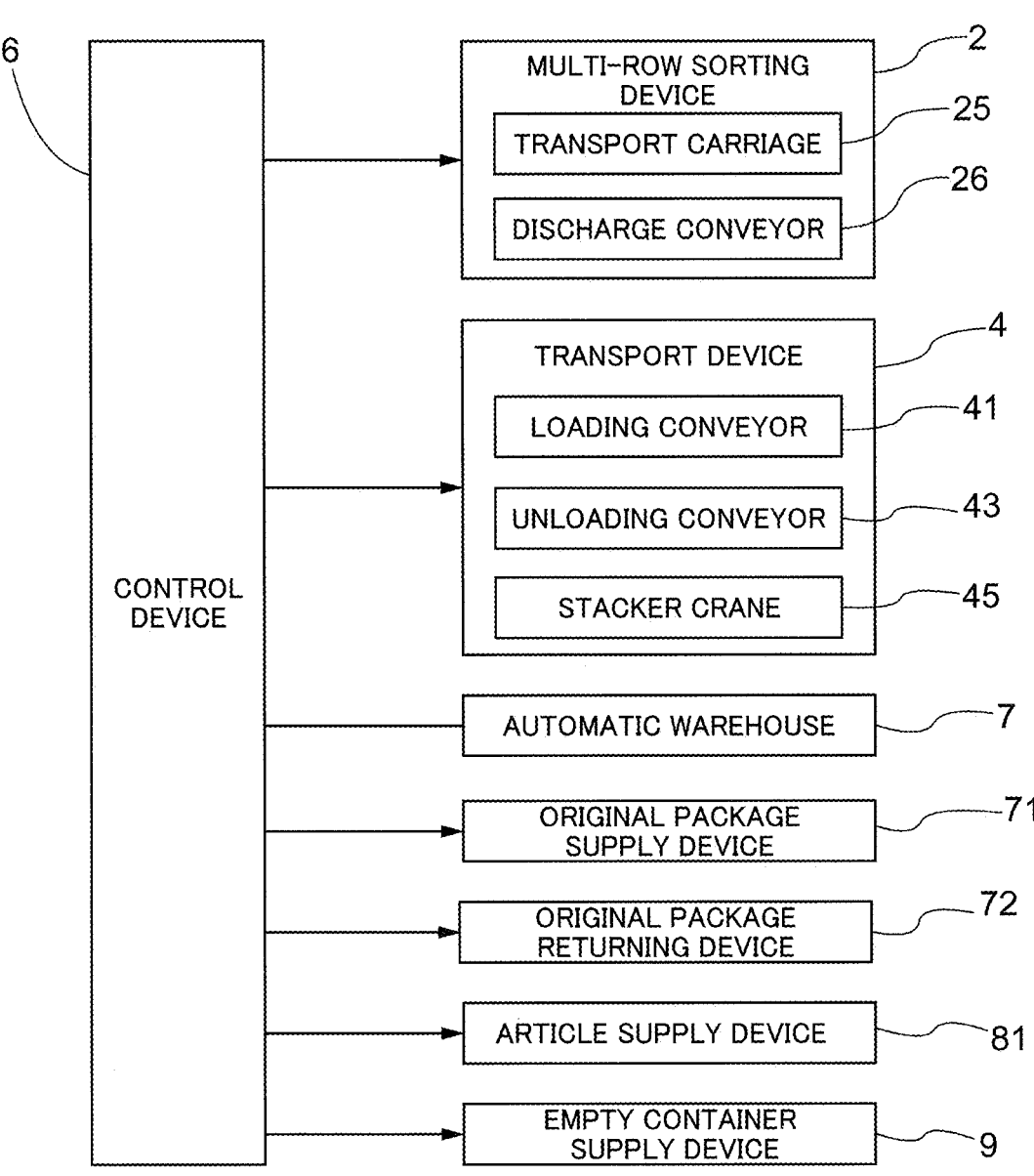
FIG. 4 is a control block diagram.

The picking system 1 includes a control device 6 that controls operations of various components of the picking system 1. As shown in FIG. 4, the control device 6 controls operations of the multi-row sorting device 2 (the transport carriage 25 and the discharge conveyor 26), and the transport device 4 (the loading conveyor 41, the unloading conveyor 43, and the stacker crane 45). In addition, the control device 6 controls operations of the automatic warehouse 7, the original package supply device 71, the original package returning device 72, the article supply device 81, and the empty container supply device 9. Specifically, the control device 6 controls operations of the various components by controlling the driving of drive devices (e.g., drive motors) for driving the various components.

Note that each article A and each accommodating container B are provided with an identification indicator such as a bar code and an IC tag. Reading devices such as a bar code reader and an IC tag reader are installed at a plurality of positions of the picking system 1, and the control device 6 is configured to be able to obtain read information from each of the reading devices. Based on the read information, the control device 6 manages the positions of the articles A and the accommodating containers B.

Figure 6:
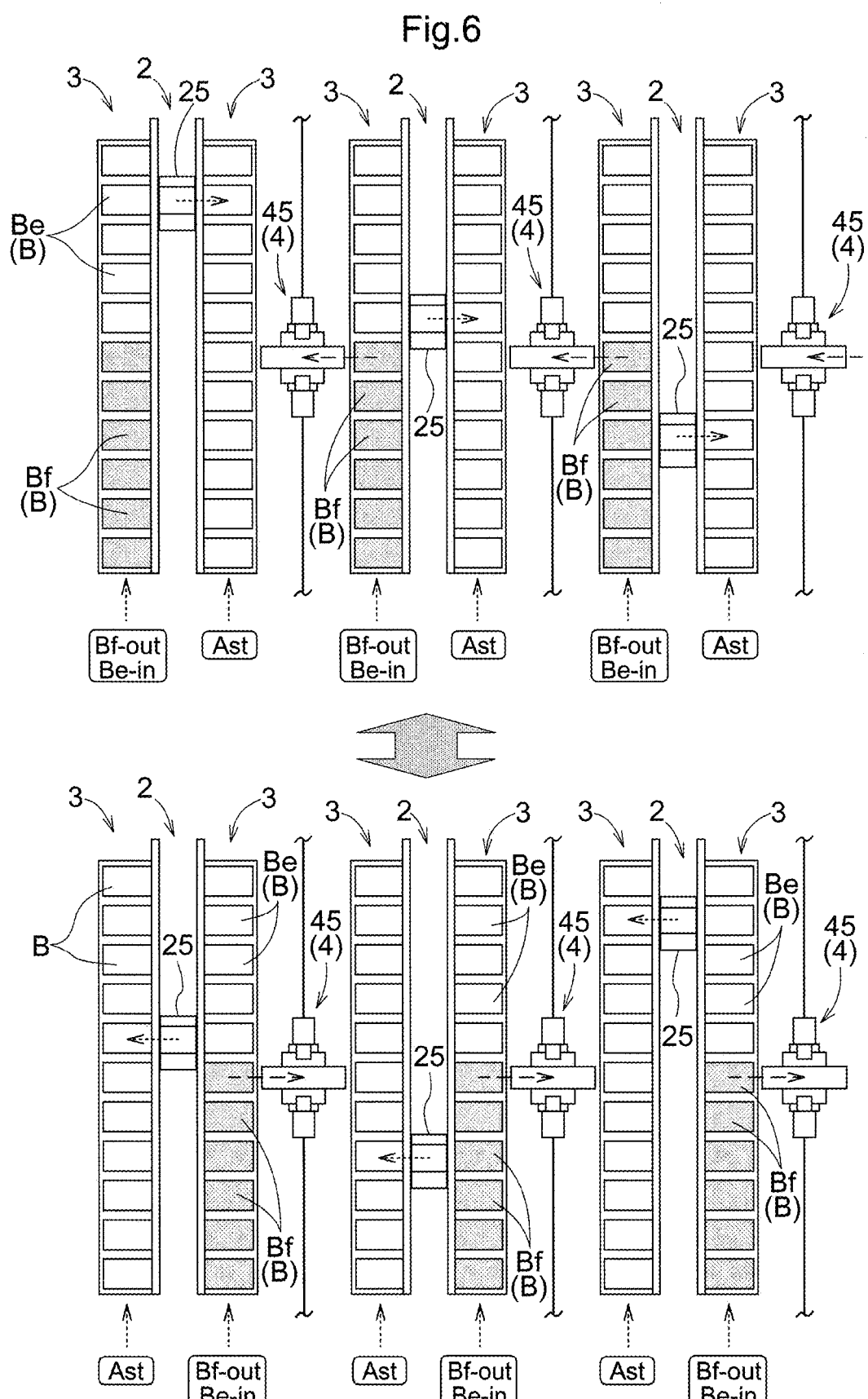
FIG. 6 is a diagram schematically illustrating a procedure of operation of the picking system.

The following will describe an example of an operation of the picking system 1 of the present embodiment. In the present embodiment, the same number of orders as the number (the number of rows×the number of columns) of exits 21 of one multi-row sorting device 2 that are located on one side in the arrangement direction Y are collectively processed in one batch. As shown in the upper stage of FIG. 6 and in FIG. 7, in one batch, articles A sorted by the multi-row sorting device 2 based on the orders are discharged to one side in the arrangement direction Y (to the right side in the shown example), and are accommodated in the accommodating containers B supported on the container supporting device 3 located on the one side. Here, first, the articles A included in all of the orders constituting this batch are sequentially supplied to the multi-row sorting devices 2. At this time, based on all of the orders, all the types of articles A to be shipped are supplied in the required numbers thereof, on a piece-by-piece basis.

Figure 5:
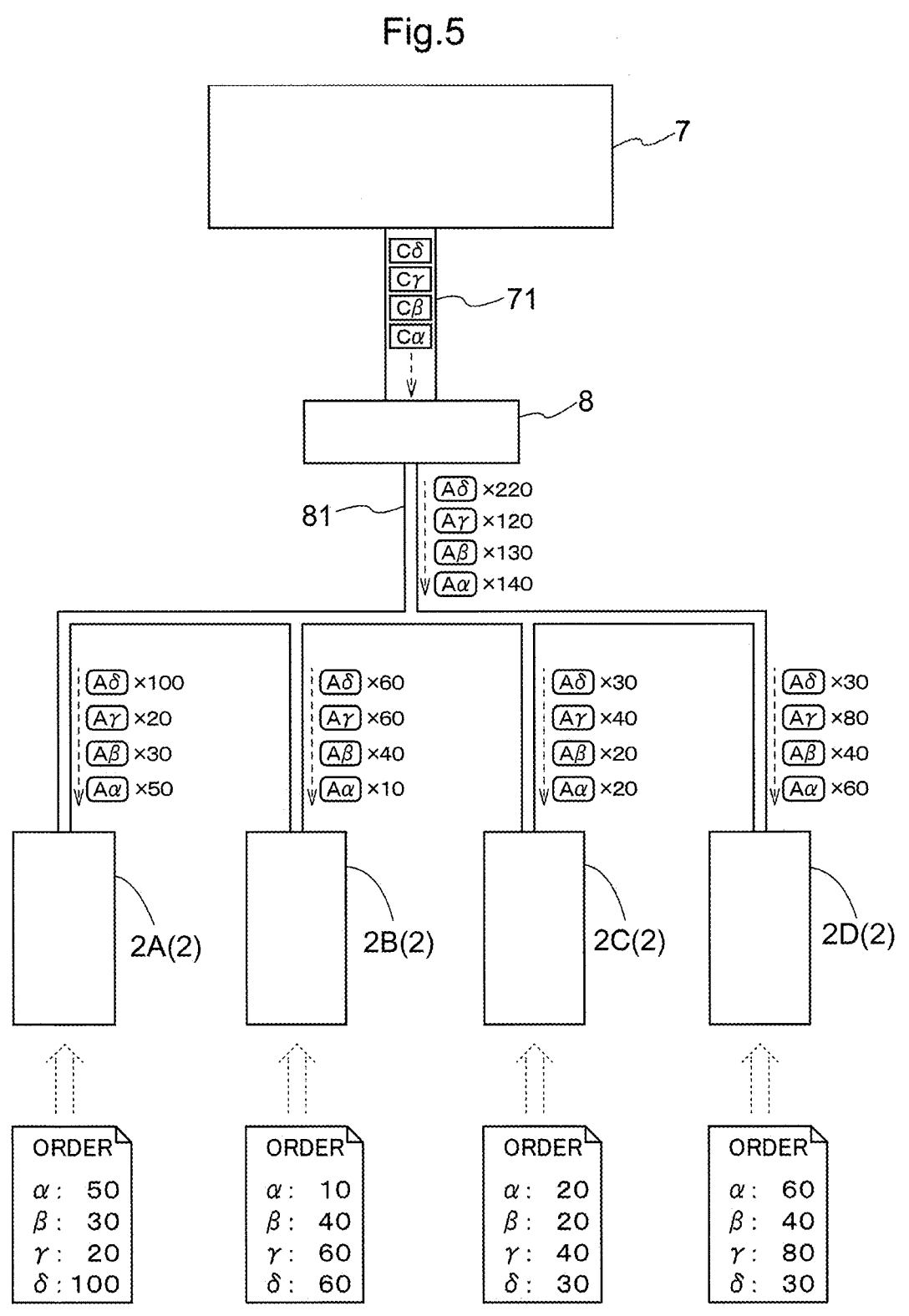

Note that when a plurality of multi-row sorting devices 2 are simultaneously operated, the articles A included in all of the orders assigned to each of the plurality of multi-row sorting devices 2 are supplied collectively from the automatic warehouse 7 in an aggregated manner for each type. Subsequently, a required number of articles A are distributed, based on the orders, to each of the multi-row sorting devices 2. This will be described with reference to a simplified model shown in FIG. 5. In this diagram, "$\alpha$" to "$\delta$" represent the types of articles A. Also, "A$\alpha$" to "A$\delta$" represent the individual articles A (pieces) of the respective types, and "C$\alpha$" to "C$\delta$" represent the original package containers in which the articles A of the respective types are accommodated.

In this example, the total number of articles A of type $\alpha$ required for all the orders assigned to a first multi-row sorting device 2A is 50, the total number of articles A of type $\beta$ is 30, the total number of articles A of type $\gamma$ is 20, and the total number of articles A of type $\delta$ is 100. The total number of articles A of type $\alpha$ required for all the orders assigned to a second multi-row sorting device 2B is 10, the total number of articles A of type β is 40, the total number of articles A of type γ is 60, and the total number of articles A of type δ is 60. The total number of articles A of type α required for all the orders assigned to a third multi-row sorting device 2C is 20, the total number of articles A of type β is 20, the total number of articles A of type γ is 40, and the total number of the articles A of type δ is 30. The total number of articles A of type α required for all the orders assigned to a fourth multi-row sorting device 2D is 60, the total number of articles A of type β is 40, the total number of articles A of type γ is 80, and the total number of articles A of type δ is 30.

In this case, the four multi-row sorting devices 2A to 2D as a whole requires 140 articles A of type α, 130 articles A of type β, 200 articles A of type γ, and 220 articles A of type δ. Accordingly, an original package container in which 140 or more articles A of type α are accommodated, an original package container in which 130 or more articles A of type β are accommodated, an original package container in which 200 or more articles A of type γ are accommodated, and an original package container in which 220 or more articles A of type δ are accommodated are carried out from the automatic warehouse 7. Note that if one original package container in which the articles A of each type are accommodated cannot satisfy the required number of articles, the articles A may be separated in a plurality of original package containers.

Subsequently, in the article unpacking portion 8, the articles A are taken out on a piece-by-piece basis from the original package containers for each type. At this time, 140 articles A of type α, 130 articles A of type β, 200 articles A of type γ, and 220 articles A of type δ are taken out, and sequentially sent to the multi-row sorting device 2 side. Then, the required number of articles A of each type are distributed and supplied to the corresponding one of the multi-row sorting devices 2A to 2D.

Figure 7:
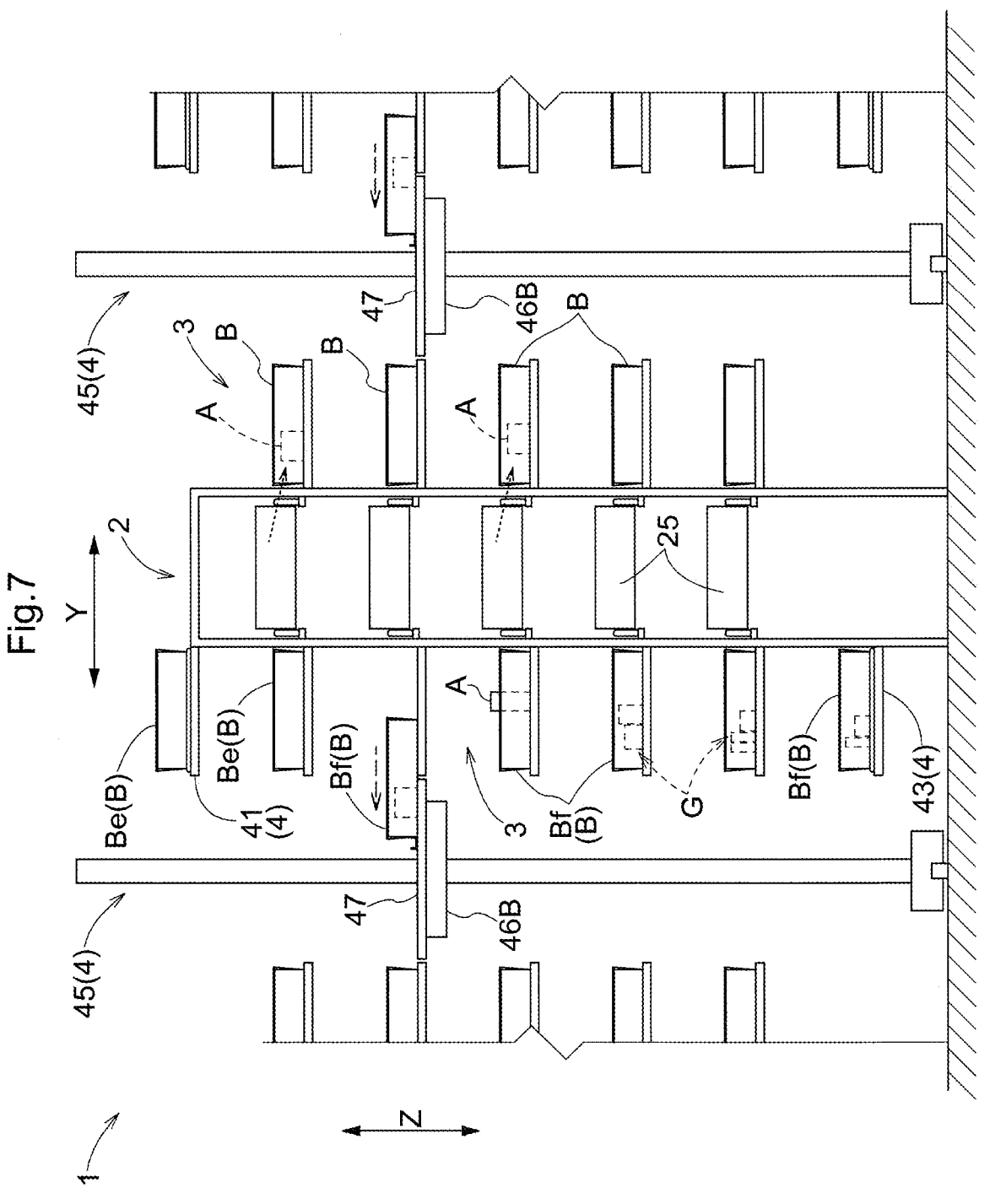
FIG. 7 is a diagram schematically illustrating a phase during operation of the picking system.
Figure 8:
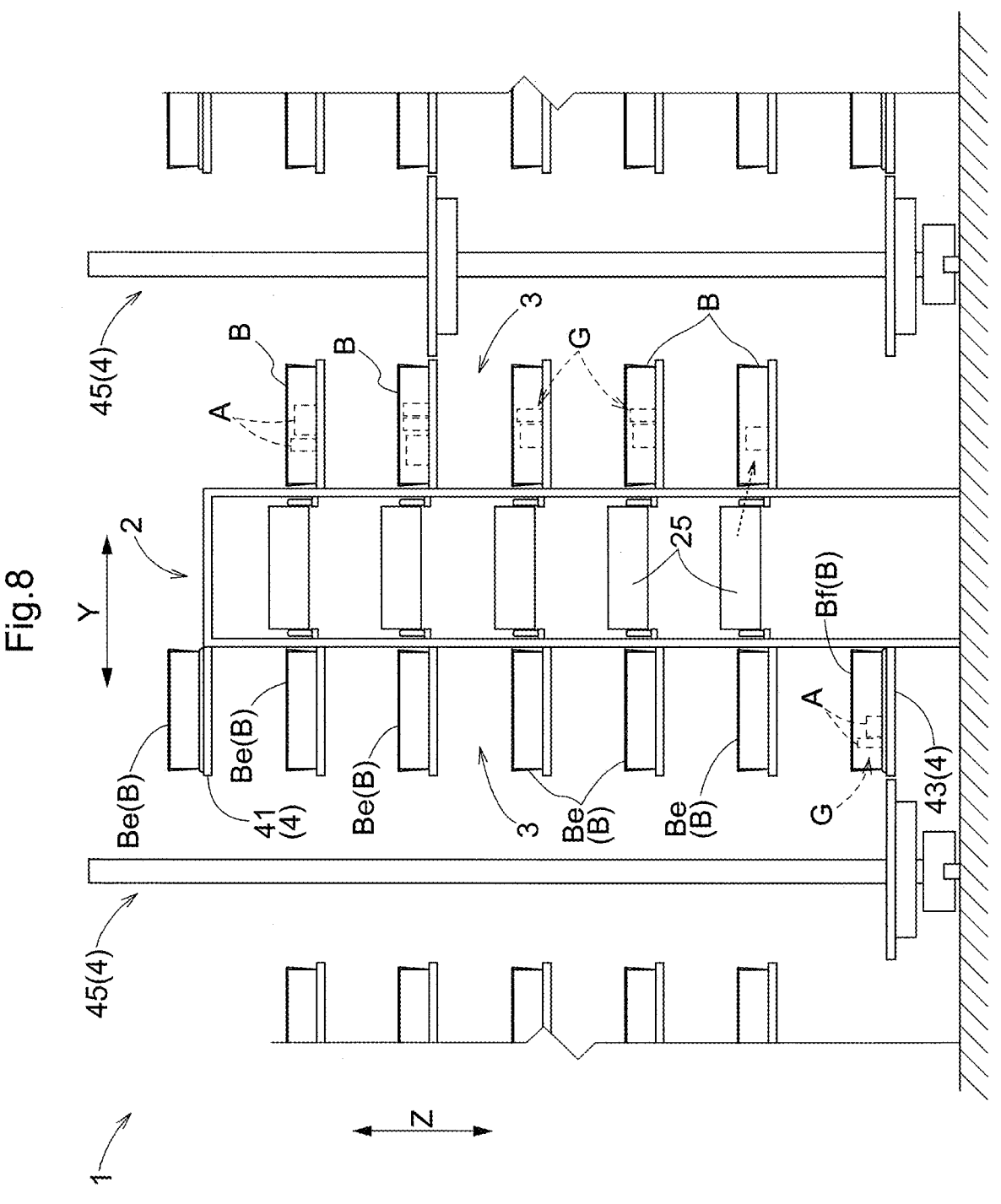
FIG. 8 is a diagram schematically illustrating a phase during operation of the picking system.

The articles A that are sequentially supplied are sorted by the multi-row sorting device 2 for each order. The plurality of exits 21 of one multi-row sorting device 2 are associated with one order. Accordingly, the multi-row sorting device 2 transports, using the transport carriage 25, each article A to the position of the exit 21 associated with the order including that article A, and then discharges, using the discharge conveyor 26, the article A from that exit 21. Then, the article A discharged from each exit 21 is accommodated in the accommodating container B supported on the container supporting device 3 as shown in FIG. 7. This process is continued until sorting for all the orders included in one batch is completed, or in other words, until the article groups G are collected in the accommodating containers B located on one side in the arrangement direction Y (see FIG. 8).

Figure 9:
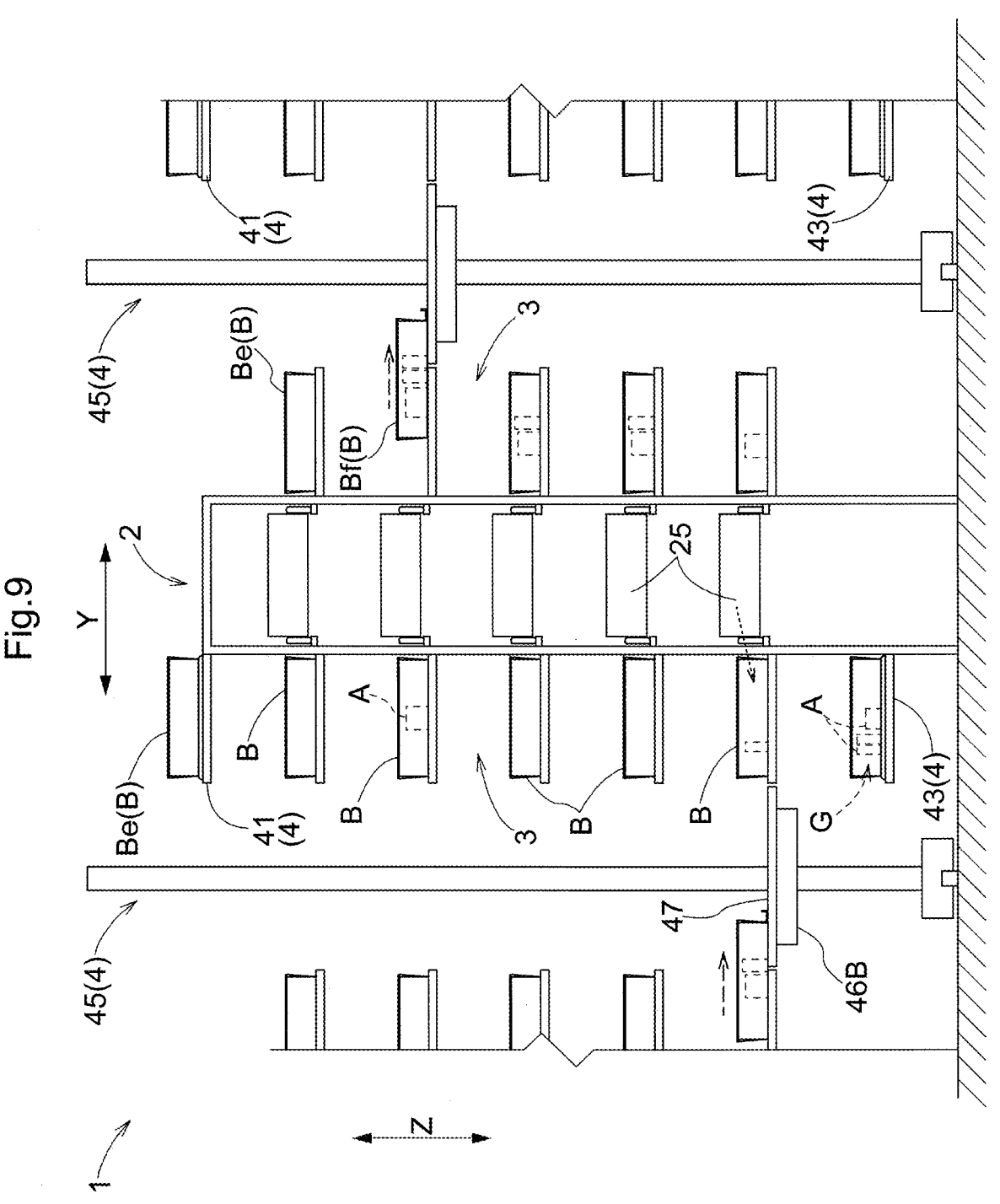
FIG. 9 is a diagram schematically illustrating a phase during operation of the picking system.

When sorting for all the orders in one batch is completed, a sorting process for the next batch is started. At this time, in the next batch, as shown in the lower stage of FIG. 6 and in FIG. 9, articles A sorted by the multi-row sorting device 2 based on orders are discharged to the other side (left side in the shown example) in the arrangement direction Y, and are accommodated in the accommodating containers B supported on the container supporting device 3 located on the other side. The specific details of the sorting process is the same as those described above.

At this time, on the one side of the multi-row sorting device 2 in the arrangement direction Y (on the right side in the shown example), the sorting for the previous batch is complete, and the full accommodating containers Bf are supported on the container supporting device 3 located on the one side. Accordingly, the full accommodating containers Bf provided on the one side in the arrangement direction Y are sequentially transported to the unloading conveyor 43 by the stacker crane 45, and are unloaded from the unloading conveyor 43. Since there is no accommodating container B on the container supporting portions 32 from which the full accommodating containers Bf are unloaded, empty accommodating containers Be that are supplied from the loading conveyor 41 are transported to these container supporting portions 32 by the stacker crane 45 to compensate for the absence. At this time, since the unloading conveyor 43 and the loading conveyor 41 are arranged at the positions at which they overlap the container supporting device 3 when viewed in the vertical direction Z, it is possible to suppress the moving distance of the stacker crane when it unloads or loads the accommodating containers B. Note that unloading of the full accommodating containers Bf and loading of the empty accommodating containers Be are preferably completed during the sorting process for this batch (see FIG. 8).

When sorting of all of the orders is complete, a sorting process for the further next batch is started. At this time, as shown in the upper stage of FIG. 6 and in FIG. 7, articles A in this batch sorted by the multi-row sorting device 2 based on orders are discharged to one side (right side in the shown example) in the arrangement direction Y, and are accommodated in the accommodating containers B supported on the container supporting device 3 located on the one side. The specific details of the sorting process is the same as those described above.

At this time, on the other side of the multi-row sorting device 2 in the arrangement direction Y, the sorting for the previous batch is complete, and the full accommodating containers Bf are supported on the container supporting device 3 located on the other side. Accordingly, the full accommodating containers Bf provided on the other side in the arrangement direction Y are sequentially transported to the unloading conveyor 43 by the stacker crane 45, and are unloaded from the unloading conveyor 43. Since there is no accommodating container B on the container supporting portions 32 from which the full accommodating containers Bf are unloaded, empty accommodating containers Be that are supplied from the loading conveyor 41 are transported to these container supporting portions 32 by the stacker crane 45 to compensate for the absence.

The above-described operations are repeatedly executed.

With this, in the present embodiment, a plurality of accommodating containers B that receive articles A from a multi-row sorting device 2 are divided into two sets (a first set of container groups and a second set of container groups) based on the positions thereof in the arrangement direction Y with respect to the multi-row sorting device 2. Also, as shown in FIGS. 6 to 9, unloading and loading the accommodating containers B that belong to one set of the first set of container groups and the second set of container groups, as well as sorting the accommodating containers B that belong to the other set (discharging the articles A from the multi-row sorting device 2) are executed in a temporarily overlapping manner. Furthermore, these operations are executed alternately for the first set of container groups and the second set of container groups. Note that in FIG. 6, "Ast" denotes that the corresponding sorting process is being executed, "Bf-out" denotes that the corresponding full accommodating container Bf is being unloaded, and "Be-in" denotes that the corresponding empty accommodating container Be is being loaded.

That is to say, in one batch, while the transport device 4 performs unloading and loading of the accommodating containers B that belong to the first set of container groups (unloading of the full accommodating containers Bf and loading of empty accommodating containers Be), the multi-row sorting device 2 discharges the articles A to the accommodating containers B that belong to the second set of container groups (sorting process). Also, in the next batch, while the transport device 4 performs unloading and loading of the accommodating containers B that belong to the second set of container groups (unloading of the full accommodating containers Bf and loading of empty accommodating containers Be), the multi-row sorting device 2 discharges the articles A to the accommodating containers B that belong to the first set of container groups (sorting process).

In the picking system 1 of the present embodiment, since the multi-row sorting device 2 including a plurality of exits 21 composed of a plurality of rows and a plurality of columns performs sorting processes, it is possible to increase the number of orders that can be collectively processed at a time. Moreover, since the multi-row sorting device 2 includes a plurality of exits 21 on each of two sides in the arrangement direction Y, it is possible to further increase the number of orders that can be collectively processed at a time. Accordingly, it is possible to enhance the process efficiency for sorting, without expanding the planar installation space for the sorting device.

Also, the picking system 1 of the present embodiment includes, as the transport device 4, the loading conveyor 41, the unloading conveyor 43, and the stacker crane 45, and thus can perform unloading of full accommodating containers Bf and loading of empty accommodating containers Be automatically and smoothly. Accordingly, it is possible to effectively perform unloading after sorting and prepare for the next unloading process, and to increase the process efficiency of the system as a whole.

Furthermore, in the picking system 1 of the present embodiment, one stacker crane 45 is shared by two multi-row sorting devices 2 adjacent to each other in the arrangement direction Y, and thus it is possible to realize space saving and a reduction in cost. Furthermore, although one stacker crane 45 is shared by two multi-row sorting devices 2, a sorting process, a process for unloading full accommodating containers Bf, and a process for loading empty accommodating containers Be are executed in a temporarily overlapping manner, alternately for the first set of container groups and the second set of container groups. Also in view of this, it is thus possible to increase the process efficiency of the system as a whole.

Second Embodiment

Next, a second embodiment of the picking system will be described. The description below of the present embodiment is focused on differences from the above-described first embodiment. The features that are not specifically described are the same as those of the above-described first embodiment.

Figure 10:
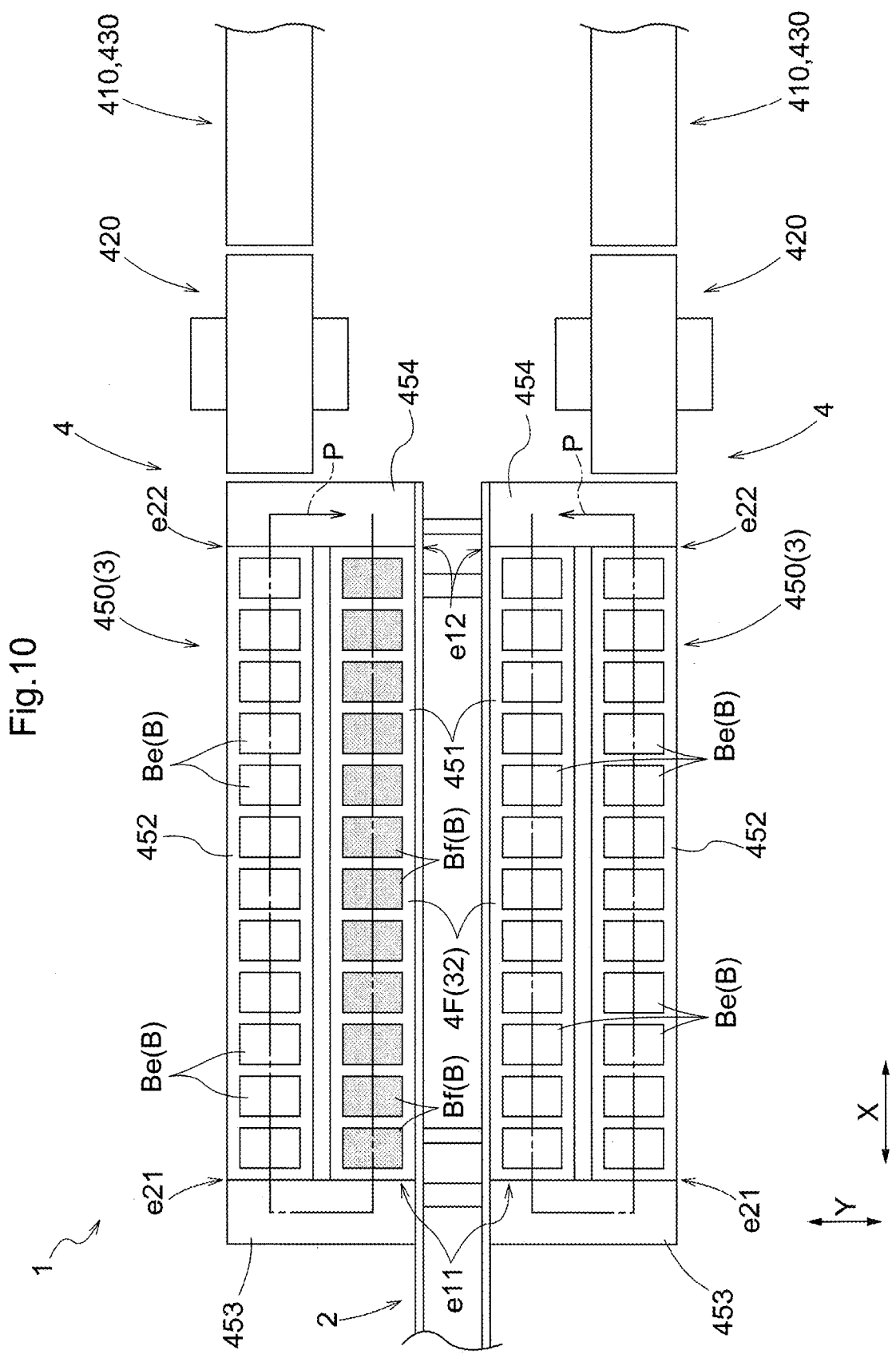
FIG. 10 is a schematic plan view illustrating a main portion of a picking system according to a second embodiment.
Figure 11:
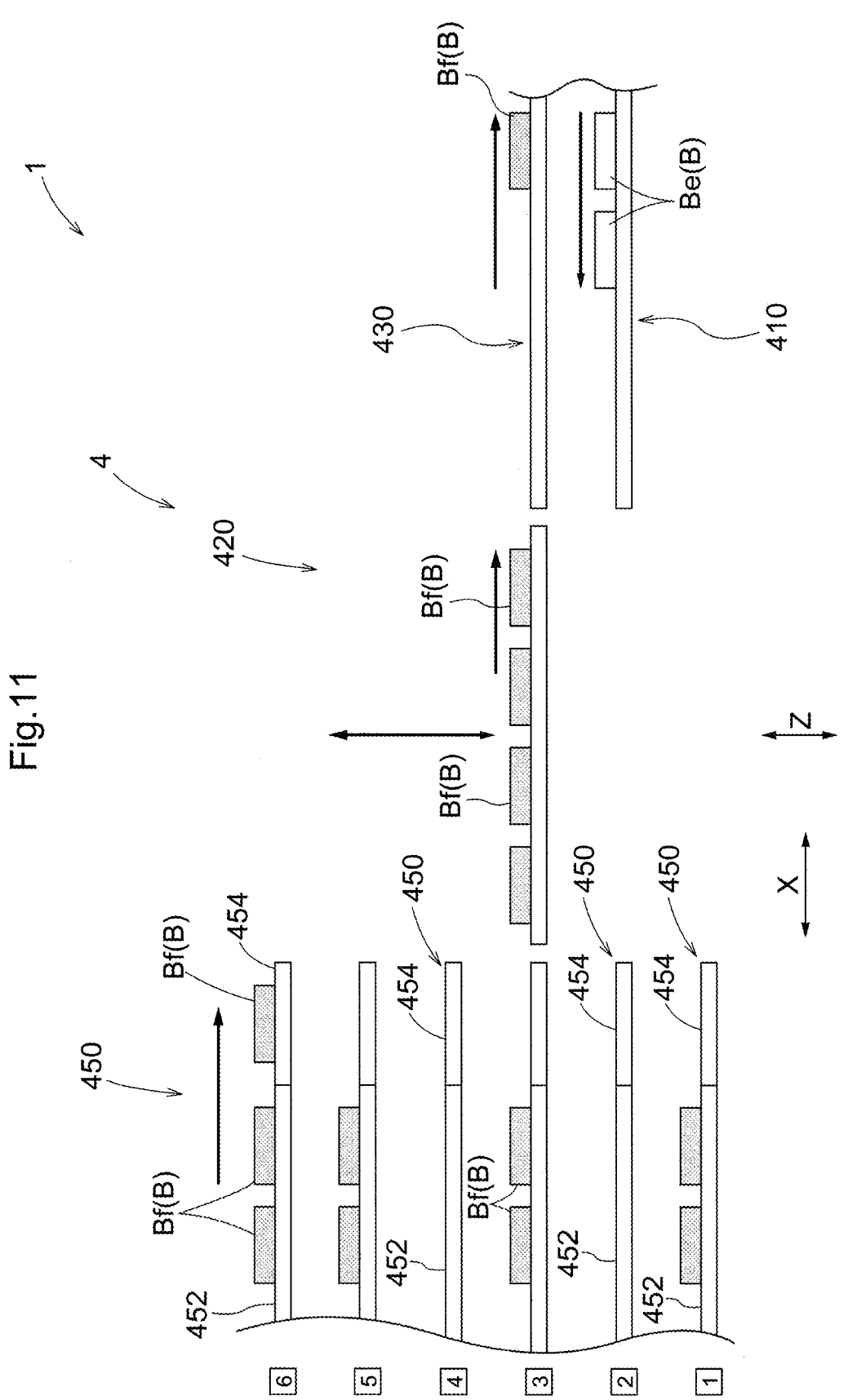
FIG. 11 is a diagram illustrating the main portion of the picking system according to the second embodiment when viewed in an arrangement direction.

FIG. 10 is a plan view schematically illustrating a main portion of the picking system 1. FIG. 11 is a diagram schematically illustrating the main portion of the picking system 1 when viewed in an arrangement direction view along the arrangement direction Y. Note that FIGS. 10 and 11 do not correspond to each other, but respectively show different operating states of the picking system 1.

As shown in FIGS. 10 and 11, in the present embodiment, the transport device 4 includes a transport conveyer 450. In the present example, the transport device 4 includes a relay transport device 420, an unloading conveyor 430 that receives and unloads full accommodating containers Bf from the transport conveyer 450 via the relay transport device 420, and a loading conveyor 410 that loads empty accommodating containers Be to the transport conveyer 450 via the relay transport device 420.

In the present embodiment, the transport device 4 is disposed on each of the two sides in the arrangement direction Y with one multi-row sorting device 2 interposed therebetween. Specifically, the transport conveyer 450, the relay transport device 420, the unloading conveyor 430, and the loading conveyor 410 are disposed on each of the two sides in the arrangement direction Y with one multi-row sorting device 2 interposed therebetween.

According to the present embodiment, the transport conveyer 450 includes a supporting face 4F capable of supporting the same number of accommodating containers B as the number of the plurality of columns of exits 21 (see FIG. 2) that are aligned in the width direction X, and is configured to transport the plurality of accommodating containers B supported on the supporting face 4F along the width direction X. That is, in the present example, the supporting face 4F also serves as the container supporting portions 32 for supporting the accommodating containers B (see FIG. 3 and the like). The transport conveyer 450 that constitutes a part of the transport device 4 also serves as the container supporting device 3 (see FIG. 3 and the like).

In the present embodiment, as shown in FIG. 10, a transport path P for accommodating containers B formed of the transport conveyer 450 is set as a closed ring-shaped path. In other words, by transporting accommodating containers B along the transport path P, the transport conveyer 450 is configured to circulate the accommodating containers B within the transport conveyer 450. Accordingly, here, the transport conveyer 450 includes, in addition to a first transport portion 451 that has the supporting face 4F, a second transport portion 452 that supports and transports the same number of accommodating containers B as the number of accommodating containers B supported on the supporting face 4F, a first connection transport portion 453 that connects a first end portion e11 of the first transport portion 451 and a first end portion e21 of the second transport portion 452, and a second connection transport portion 454 that connects a second end portion e12 of the first transport portion 451 and a second end portion e22 of the second transport portion 452.

In the present embodiment, the first transport portion 451 is arranged adjacent to the multi-row sorting device 2, and the second transport portion 452 is arranged on a side further away from the multi-row sorting device 2 than the first transport portion 451. Also, the first transport portion 451 is a portion serving as the container supporting portions 32 that support empty accommodating containers Be that receive articles A from the multi-row sorting device 2. Also, the second transport portion 452 is a portion serving as an accumulation portion (buffer) that temporarily accumulates empty accommodating containers Be to be supplied to the first transport portion 451, and temporarily accumulates full accommodating containers Bf supplied from the first transport portion 451. In the example shown in FIG. 10, both the first transport portion 451 and the second transport portion 452 are designed to form a straight transport path. Also, the first transport portion 451 and the second transport portion 452 are arranged adjacent to each other in the arrangement direction Y, and parallel to each other.

In the present embodiment, the first transport portion 451 extends straight in the width direction X. Also, the second transport portion 452 extends straight in the width direction X. In this way, since both the first transport portion 451 and the second transport portion 452 extend in the width direction X, the picking system 1 as a whole can realize space saving in the arrangement direction Y, which is orthogonal to this width direction X.

The first connection transport portion 453 connects the first end portion e11 of the first transport portion 451 and the first end portion e21 of the second transport portion 452, and extends in the arrangement direction Y. The first connection transport portion 453 is configured to be able to transport accommodating containers B in both the arrangement direction Y and the width direction X. Specifically, the first connection transport portion 453 is configured to be able to transport the accommodating containers B in the width direction X in a portion in which the accommodating containers B are to be transferred from the first transport portion 451, and in a portion in which the accommodating containers B are to be transferred to the second transport portion 452, and transport the accommodating containers B in the arrangement direction Y in the other portion. The first connection transport portion 453 is configured as a so-called Transfer (transport direction changing device) that can change the transport direction for accommodating containers B. Note that the first end portion e11 of the first transport portion 451 is an end portion of the first transport portion 451 on one side in the width direction X (left side of FIG. 10). Similarly, the first end portion e21 of the second transport portion 452 is an end portion of the second transport portion 452 on one side in the width direction X (left side of FIG. 10).

The second connection transport portion 454 connects the second end portion e12 of the first transport portion 451 and the second end portion e22 of the second transport portion 452, and extends in the arrangement direction Y. The second connection transport portion 454 is configured to be able to transport the accommodating containers B in both the arrangement direction Y and the width direction X. Specifically, the second connection transport portion 454 is configured to be able to transport the accommodating containers B in the width direction X in a portion in which the accommodating containers B are to be transferred to the first transport portion 451, and in a portion in which the accommodating containers B are to be transferred from the second transport portion 452, and transport the accommodating containers B in the arrangement direction Y in the other portion. Similar to the above-described first connection transport portion 453, the second connection transport portion 454 is configured as a so-called Transfer (transport direction changing device) that can change the transport direction for accommodating containers B. Note that the second end portion e12 of the first transport portion 451 is an end portion (the other end portion) of the first transport portion 451 on the side (right side of FIG. 10) in the width direction X opposite to the first end portion e11. Similarly, the second end portion e22 of the second transport portion 452 is an end portion (the other end portion) of the second transport portion 452 on the side (right side of FIG. 10) in the width direction X opposite to the first end portion e21.

In this way, since the transport conveyer 450 includes the first transport portion 451, the second transport portion 452, the first connection transport portion 453, and the second connection transport portion 454, which are directly or indirectly connected to each other, it is possible to circulate accommodating containers B within the transport conveyer 450. The transport path P for the accommodating containers B formed of the transport conveyer 450 is set along these first transport portion 451, the second transport portion 452, the first connection transport portion 453, and the second connection transport portion 454. In the present example, the transport device 4 includes a plurality of such transport conveyers 450 at different heights in the vertical direction Z (see FIG. 11). In the example shown in FIG. 11, six rows of transport conveyers 450 are arranged on each other in the vertical direction Z.

As shown in FIGS. 10 and 11, the unloading conveyor 430 is configured to receive full accommodating containers Bf from the transport conveyer 450 via the relay transport device 420, and unload the received full accommodating containers Bf. The unloading conveyor 430 unloads the full accommodating containers Bf toward the shipping area side (right side of FIGS. 10 to 12). In the present embodiment, the unloading conveyor 430 is arranged so as to be adjacent to the second transport portion 452 and the relay transport device 420 in the width direction X when viewed in the vertical direction (see FIG. 10). That is, in the present embodiment, the unloading conveyor 430 is configured to receive the full accommodating containers Bf supported on the second transport portion 452 via the second connection transport portion 454 and the relay transport device 420. Also, as shown in FIG. 11, in the present example, the number of unloading conveyors 430 is less (here, one) than the number of the plurality of transport conveyers 450 arranged in a plurality of rows in the vertical direction Z. In the shown example, the unloading conveyor 430 is arranged at the same height as the transport conveyer 450 in the third row from below. Note however that the present disclosure is not limited to such a configuration, and the unloading conveyor 430 can be installed at a suitable height. Also, the number of unloading conveyors 430 may be a suitable number. For example, the same number of unloading conveyors 430 as the number of transport conveyers 450 may be provided, or the number of unloading conveyors 430 may be set to a half of the number of transport conveyers 450.

As shown in FIGS. 10 and 11, the loading conveyor 410 is configured to load empty accommodating containers Be to the transport conveyer 450 via the relay transport device 420. The loading conveyor 410 loads the empty accommodating container Be supplied, for example, from an empty container supply device (not shown). In the present embodiment, the loading conveyor 410 is arranged so as to be adjacent to the second transport portion 452 and the relay transport device 420 in the width direction X when viewed in the vertical direction (see FIG. 10). That is, in the present embodiment, the loading conveyor 410 is configured to give the empty accommodating containers Be to the second transport portion 452 via the relay transport device 420 and the second connection transport portion 454. Also, as shown in FIG. 11, in the present example, the number of loading conveyors 410 is less (here, one) than the number of the transport conveyers 450 arranged in a plurality of rows in the vertical direction Z. In the shown example, the loading conveyor 410 is arranged at the same height as the transport conveyer 450 in the second row from below. Note however that the present disclosure is not limited to such a configuration, and the loading conveyor 410 can be installed at a suitable height. Also, the number of loading conveyors 410 may be a suitable number. For example, the same number of loading conveyors 410 as the number of transport conveyers 450 may be provided, or the number of loading conveyors 410 may be set to a half of the number of transport conveyers 450.

As shown in FIGS. 10 and 11, in the present embodiment, the unloading conveyor 430 and the loading conveyor 410 are disposed so as to overlap each other when viewed in the vertical direction along the vertical direction Z, and so as to be distanced from each other in the vertical direction Z. Accordingly, it is possible to reduce the floor area occupied by the picking system 1 overall.

As shown in FIG. 10, the relay transport device 420 is arranged between each of the unloading conveyor 430 and the loading conveyor 410, and the transport conveyer 450 when viewed in the vertical direction. Also, the relay transport device 420 is configured to relay accommodating containers B between each of the unloading conveyor 430 and the loading conveyor 410, and the transport conveyer 450. In the shown example, the relay transport device 420 is arranged between the second transport portion 452 of the transport conveyer 450, and each of the unloading conveyor 430 and the loading conveyor 410 when viewed in the vertical direction. Also, one relay transport device 420 is provided for the transport conveyers 450 in the plurality of rows aligned in the vertical direction Z.

In the present embodiment, the relay transport device 420 is configured to transport the accommodating containers B in the vertical direction Z. In the present example, the relay transport device 420 is configured as a so-called lifter that moves up and down in the vertical direction Z in a state in which the accommodating containers B are placed and supported thereon. Also, the relay transport device 420 is configured to be able to transport the supported accommodating containers B also in the width direction X. That is, the relay transport device 420 is configured to transport accommodating containers B both in the vertical direction Z and the width direction X. For example, when a full accommodating container Bf is to be unloaded, the relay transport device 420 moves up or down to the position that corresponds to a target transport conveyer 450, out of the transport conveyers 450 arranged in the plurality of rows, and receives the full accommodating container Bf transported in the width direction X at this position. Then, the relay transport device 420 moves up or down to the position that corresponds to the unloading conveyor 430, and transports the full accommodating container Bf in the width direction X at this position, thereby giving this full accommodating container Bf to the unloading conveyor 430. Also, for example, when an empty accommodating container Be is to be loaded, the relay transport device 420 moves up or down to the position that corresponds to the loading conveyor 410, and receives the empty accommodating container Be transported in the width direction X at this position. Then, the relay transport device 420 moves up or down to the position that corresponds to a target transport conveyer 450, out of the transport conveyers 450 arranged in the plurality of rows, and transports the empty accommodating container Be in the width direction X at this position, thereby giving this empty accommodating container Be to the corresponding transport conveyer 450.

Here, the number of accommodating containers B that can be transported by the relay transport device 420 is less than the number of accommodating containers B that can be supported by the first transport portion 451 or the second transport portion 452. In the example shown in FIG. 10, each of the first transport portion 451 and the second transport portion 452 is configured to be able to support twelve accommodating containers B at a time. On the other hand, the relay transport device 420 is configured to be able to transport four accommodating containers B at a time (see FIG. 11). Therefore, in the present example, the relay transport device 420 splits the transport of the twelve accommodating containers B, that can be collectively supported by the first transport portion 451 or the second transport portion 452, into three separate times.

This picking system 1 executes a sorting process (Ast: Assort) of sorting articles A based on orders, and placing the sorted articles A in target accommodating containers B, an unloading process (Bf-out) of unloading full accommodating containers Bf for which the sorting process (Ast) is complete, and a loading process (Be-in) of loading empty accommodating containers Be. Furthermore, in the present example, the picking system 1 executes a replacement process (Rot: Rotation) of replacing full accommodating containers Bf supported on the first transport portion 451 with empty accommodating containers Be supported on the second transport portion 452. These processes are executed by the control device 6 (see FIG. 4) controlling operations of the components.

FIG. 10 shows a state after the sorting process (Ast) is complete on one side of the multi-row sorting device 2 in the arrangement direction Y. The sorting process (Ast) is executed by the operation of the multi-row sorting device 2. After the completion of the sorting process (Ast), all of the accommodating containers B supported on the first transport portion 451 (supporting face 4F) are full accommodating containers Bf. In the example shown in FIG. 10, all of the twelve accommodating containers B supported on the first transport portion 451 arranged on one side of the multi-row sorting device 2 in the arrangement direction Y are full accommodating containers Bf. Also, with the later-described loading process (Be-in), at this point in time, twelve empty accommodating containers Be are loaded and supported on the second transport portion 452 arranged on the one side of the multi-row sorting device 2 in the arrangement direction Y.

Figure 12:
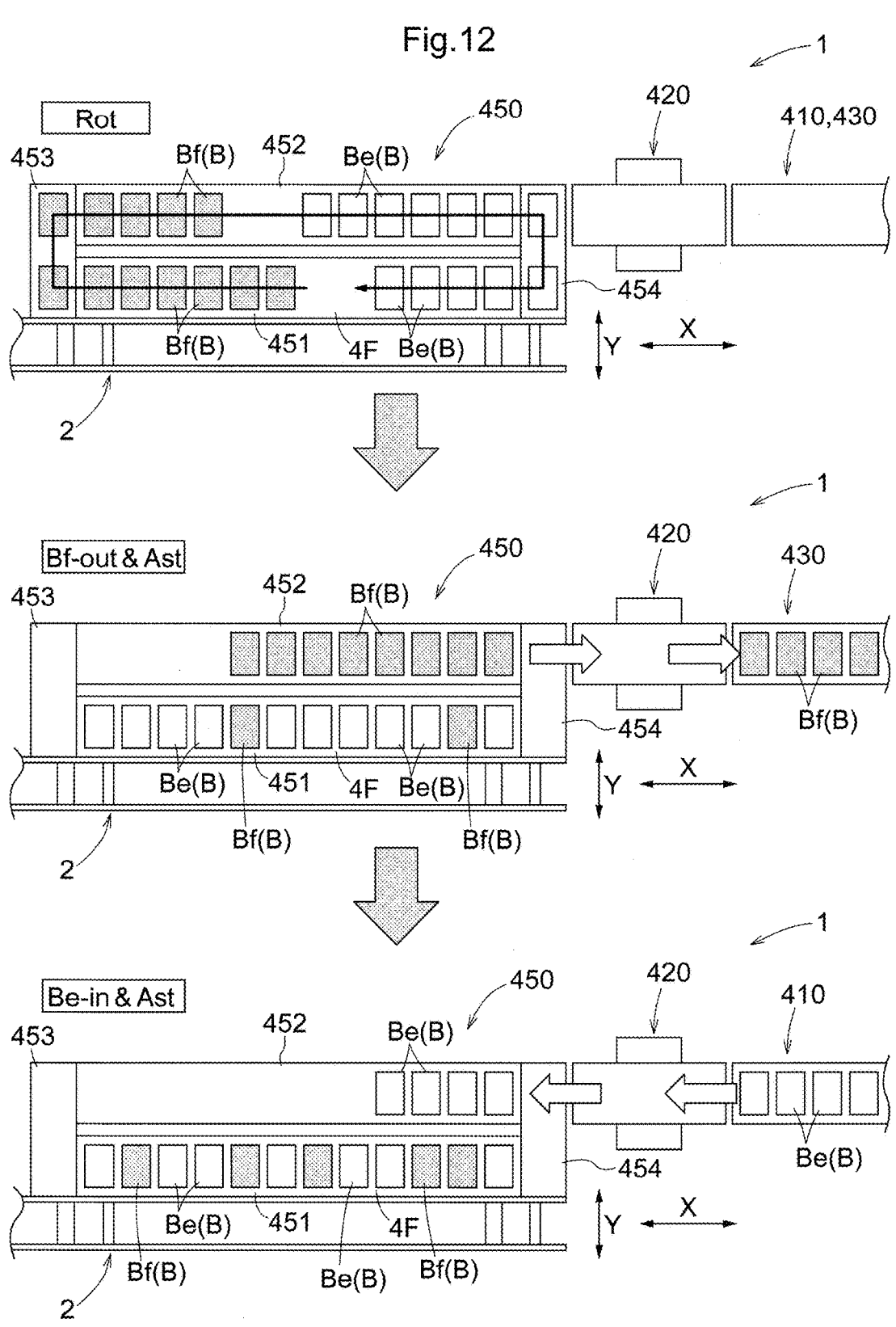
FIG. 12 is a diagram illustrating processes of the picking system according to the second embodiment.

Also, the replacement process (Rot) is executed as shown in FIG. 12 after the completion of the sorting process (Ast). In the replacement process (Rot), the full accommodating containers Bf supported on the first transport portion 451 are replaced by the empty accommodating containers Be supported on the second transport portion 452. That is, the empty accommodating containers Be supported on the second transport portion 452 are transported to the first transport portion 451, and the full accommodating containers Bf supported on the first transport portion 451 are transported to the second transport portion 452. In the present example, the picking system 1 circulates the full accommodating containers Bf and the empty accommodating containers Be within the transport conveyer 450 along the first transport portion 451, the first connection transport portion 453, the second transport portion 452, and the second connection transport portion 454, and thereby executes the replacement process (Rot).

Then, the unloading process (Bf-out) is executed after the completion of the replacement process (Rot). In the unloading process (Bf-out), the full accommodating containers Bf supported on the second transport portion 452 are transported to the unloading conveyor 430 via the relay transport device 420, and are further unloaded to an unloading destination by the unloading conveyor 430. In the unloading process (Bf-out) of the present example, the relay transport device 420 splits the transportation of the twelve full accommodating containers Bf supported on the second transport portion 452 with four containers each to the unloading conveyor 430 into three separate times. After the completion of the unloading process (Bf-out), no accommodating container B is disposed on the second transport portion 452.

Then, the loading process (Be-in) is executed after the completion of the unloading process (Bf-out). In the loading process (Be-in), empty accommodating containers Be are transported to the second transport portion 452 on which no accommodating container B is arranged from the loading conveyor 410 via the relay transport device 420. In the loading process (Be-in) of the present example, the relay transport device 420 splits the transportation of twelve empty accommodating containers Be with four containers each to the second transport portion 452 into three separate times.

Here, in the previous stage before the unloading process (Bf-out) and the loading process (Be-in) are executed, empty accommodating containers Be are disposed on the first transport portion 451 as a result of execution of the replacement process (Rot). Therefore, in the present embodiment, also during the execution of the unloading process (Bf-out) and the loading process (Be-in), a sorting process (Ast) of placing sorted articles A in target accommodating containers B is executed (Bf-out & Ast and Be-in & Ast). That is, in the present embodiment, the period in which the sorting process (Ast) needs to be halted is only a period in which the replacement process (Rot) is executed. Accordingly, it is possible to improve the process efficiency of the picking system 1 as a whole. Note that it is also possible that the sorting process (Ast) is executed only during the execution of either of the unloading process (Bf-out) and the loading process (Be-in).

The following will describe a specific example of the order of processes executed in terms of one multi-row sorting device 2.

Figure 13:
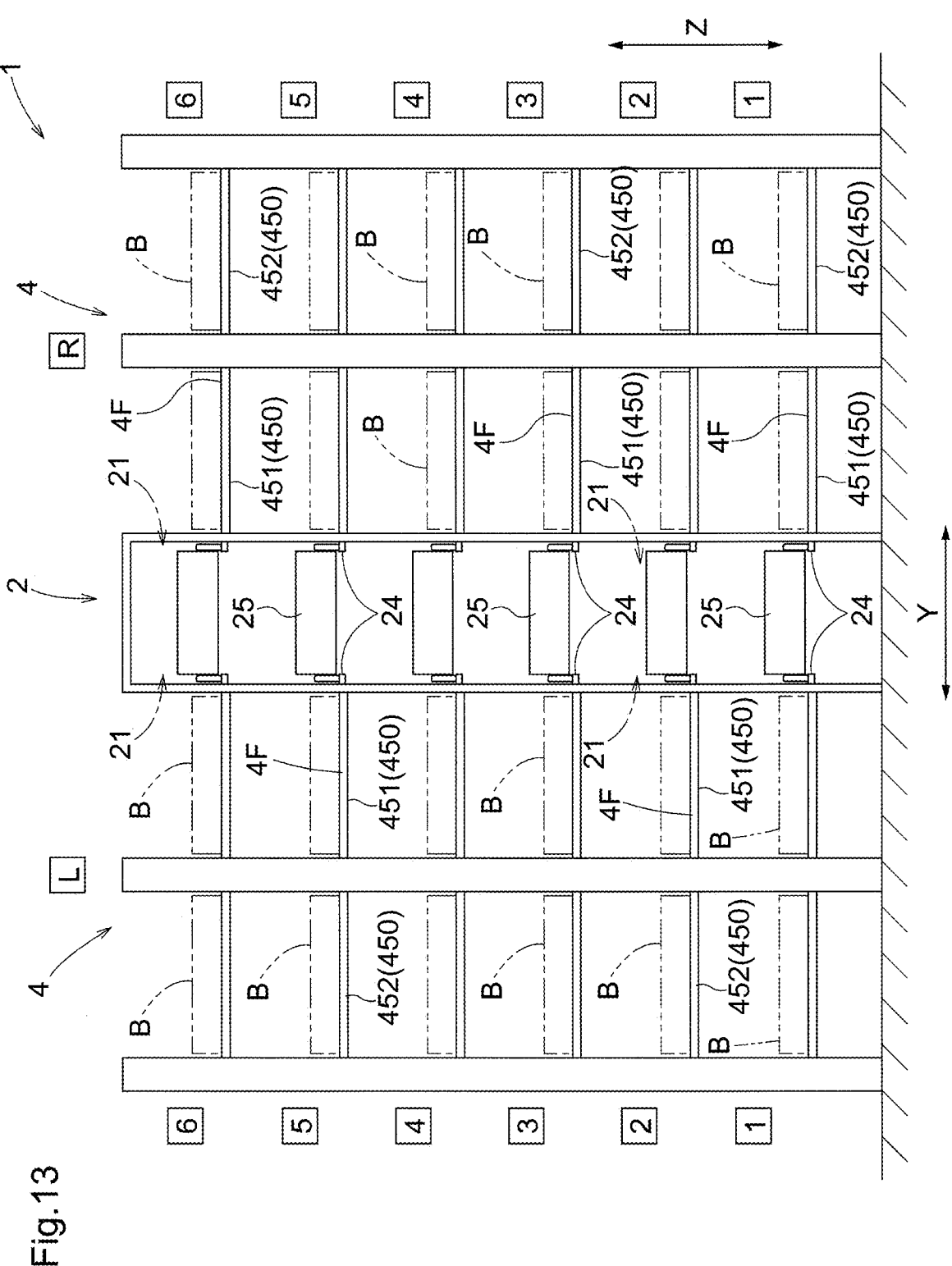
FIG. 13 is diagram illustrating the main portion of the picking system according to the second embodiment when viewed in a width direction.

As shown in FIG. 13, in the present embodiment, the transport devices 4 are provided on the two sides in the arrangement direction Y with one multi-row sorting device 2 interposed therebetween. In the shown example, the transport devices 4 are provided on both the right side R and the left side L of the multi-row sorting device 2. Each of the pair of transport devices 4 includes six rows of transport conveyers 450. As show in FIG. 13, on each of the right side R and the left side L of the multi-row sorting device 2, the first-row transport conveyer 450, the second-row transport conveyer 450, . . . , the sixth-row transport conveyer 450 are arranged from below.

Figure 14:
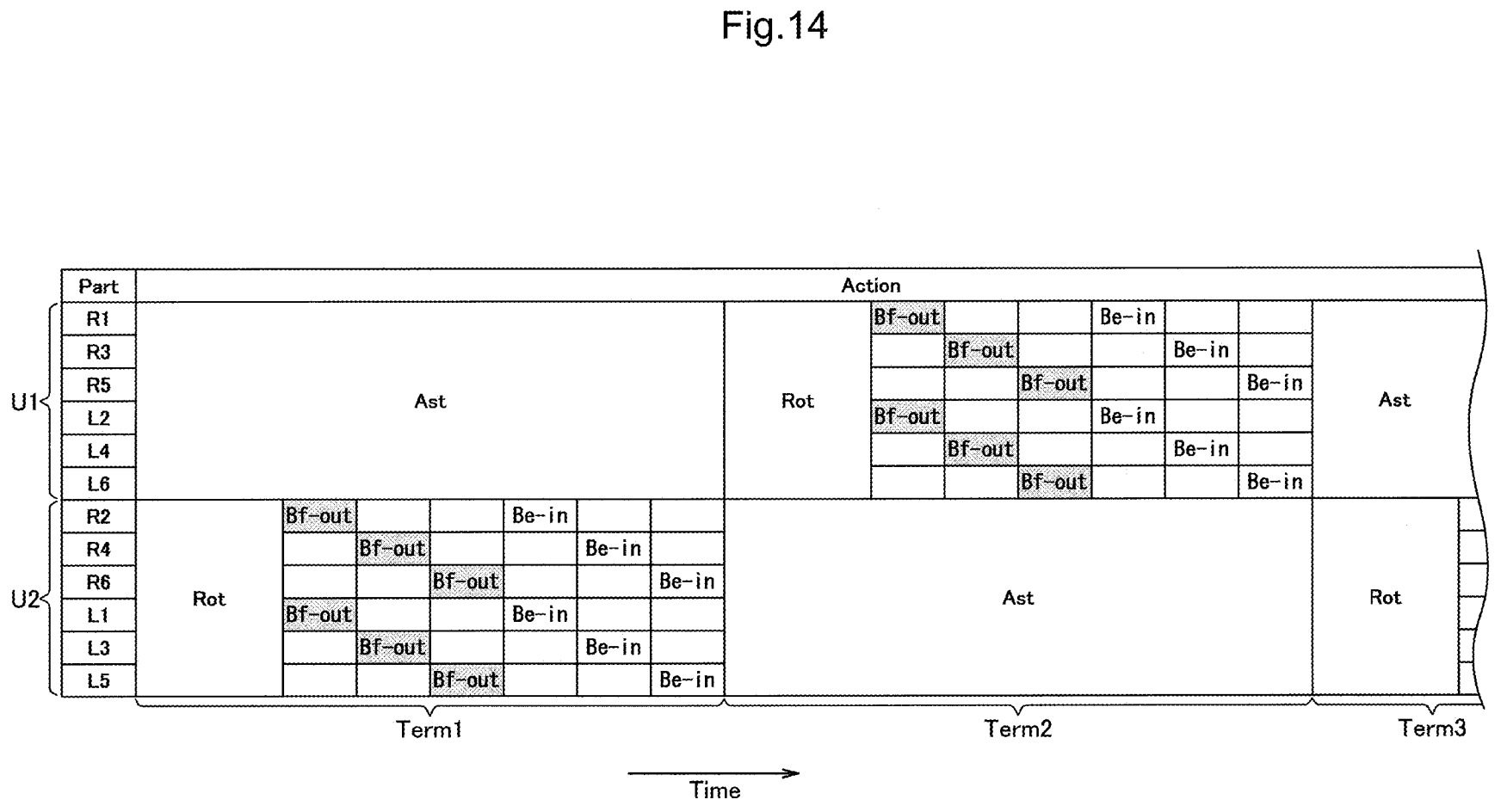

Also, FIG. 14 shows a time chart in which the horizontal axis indicates time. In FIG. 14, "R1" denotes the first-row transport conveyer 450 on the right side R of FIG. 13, and "R2" denotes the second-row transport conveyer 450 on the right side R. The same rule applies to "R3" to "R6", which denote the transport conveyers 450 in the respective corresponding rows on the right side R of FIG. 13. In FIG. 14, "L1" denotes the first-row transport conveyer 450 on the left side L of FIG. 13, and "L2" denotes the second-row transport conveyer 450 on the left side L. The same rule applies to "L3" to "L6", which denote the transport conveyers 450 in the respective corresponding rows on the left side L of FIG. 13. Also, FIG. 14 shows the relationship between the operations that are executed by the transport conveyers 450 in the respective rows on the respective sides, and the course of time.

In the present embodiment, the picking system 1 (control device 6, see FIG. 4) operates some of the plurality of rows of transport conveyers 450 arranged on one side (for example, the right side R) of the multi-row sorting device 2 in the arrangement direction Y, and some of the plurality of rows of transport conveyers 450 arranged on the other side (for example, the left side L), in a temporarily overlapping manner. Then, the picking system 1 operates the remaining of the plurality of rows of transport conveyers 450 arranged on one side (for example, the right side R) of the multi-row sorting device 2 in the arrangement direction Y, and the remaining of the plurality of rows of transport conveyers

450 arranged on the other side (for example, the left side L), in a temporarily overlapping manner.

Specifically, as shown in FIG. 14, in the present embodiment, the picking system 1 operates the first, third, and fifth-row transport conveyers (R1, R3, and R5) located on the right side R, and the second, fourth, and sixth-row transport conveyers (L2, L4, and L6) located on the left side L, which serve as a first conveyer group U1, in a temporarily overlapping manner. Also, the picking system 1 operates the second, fourth, and sixth-row transport conveyer (R2, R4, and R6) located on the right side R, and the first, third, and fifth-row transport conveyers (L1, L3, and L5) located on the left side L, which serve as a second conveyer group U2, in a temporarily overlapping manner.

In the present embodiment, the multi-row sorting device 2 is configured to transport and sort articles A with respect to each of the plurality of rows. Accordingly, the transport conveyers 450 that belong to the first conveyer group U1 and the transport conveyers 450 that belong to the second conveyer group U2 are set so that the transport conveyers 450 located in the same row on the left and right sides are not subjected to the sorting process (Ast) in a temporarily overlapping manner. Accordingly, the sorting capability of each row of the multi-row sorting device 2 can be used efficiently, and thus it is possible to increase the efficiency of the sorting process. Note that the configuration of the multi-row sorting device 2 is not limited to the description above, and thus the combination of transport conveyers 450 constituting the first conveyer group U1 or the second conveyer group U2 may be suitably set according to the configuration of the multi-row sorting device 2.

As shown in FIG. 14, in the present example, the picking system 1 executes, in a first term (Term1), the sorting process (Ast) on the first conveyer group U1, and executes the replacement process (Rot), the unloading process (Bf-out), and the loading process (Be-in) on the second conveyer group U2.

Specifically, the picking system 1 executes, in the first term (Term1), the sorting process (Ast) of placing the articles A sorted by the multi-row sorting device 2 based on orders in the accommodating containers B supported on the transport conveyers (R1, R3, R5, L2, L4, and L6) belonging to the first conveyer group U1.

Also, during this first term (Term1), the picking system 1 first executes the replacement process (Rot) on the transport conveyers (R2, R4, R6, L1, L3, and L5) belonging to the second conveyer group U2 to move twelve full accommodating containers Bf supported on the first transport portion 451 to the second transport portion 452 of each of the transport conveyers (R2, R4, R6, L1, L3, and L5), and move twelve empty accommodating containers Be supported on the second transport portion 452 to the first transport portion 451. Note here that the twelve full accommodating containers Bf supported on the first transport portion 451 are obtained as a result of the sorting process (Ast) executed on the not-shown previous term, and the twelve empty accommodating containers Be supported on the second transport portion 452 are obtained as a result of the loading process (Be-in) executed on the not-shown previous term. By the execution of the replacement process (Rot), it is possible to arrange the empty accommodating containers Be at positions at which the articles A discharged from the multi-row sorting device 2 can be accommodated, and arrange the full accommodating containers Bf at positions at which they can be transported by the relay transport device 420. Accordingly, preparation for the sorting process (Ast) for the next second term (Term2), and preparation for the unloading process (Bf-out) for the first term (Term1) are made. Then, on each of the right side R and the left side L of the multi-row sorting device 2, the relay transport device 420 executes the unloading process (Bf-out) and the loading process (Be-in) for each row.

In the present example, as shown in FIG. 14, in the first term (Term1), on the right side R of the multi-row sorting device 2, the unloading process (Bf-out) is executed in the order from the second-row transport conveyer R2, the fourth-row transport conveyer R4, and the sixth-row transport conveyer R6. Also, at the same time, on the left side L of the multi-row sorting device 2, the unloading process (Bf-out) is executed in the order from the first-row transport conveyer L1, the third-row transport conveyer L3, and the fifth-row transport conveyer L5.

Also, when the unloading process (Bf-out) is ended on the right side R of the multi-row sorting device 2, the second transport portion 452 of each of the transport conveyers (R2, R4, and R6) is in an empty state in which no accommodating container B is arranged. Accordingly, on the right side R of the multi-row sorting device 2, the loading process (Be-in) is executed in the order from the second-row transport conveyer R2, the fourth-row transport conveyer R4, and the sixth-row transport conveyer R6. Similarly, when the unloading process (Bf-out) is ended on the left side L of the multi-row sorting device 2, the second transport portion 452 of each of the transport conveyers (L1, L3, and L5) is in the empty state in which no accommodating container B is arranged. Accordingly, on the left side L of the multi-row sorting device 2, the loading process (Be-in) is executed in the order from the first-row transport conveyer L1, the third-row transport conveyer L3, and the fifth-row transport conveyer L5. The above-described replacement process (Rot), unloading process (Bf-out), and loading process (Be-in) that are executed on the second conveyer group U2 in the first term (Term1) are preferably complete before the sorting process (Ast) for the first conveyer group U1 is ended.

As shown in FIG. 14, after the completion of the first term (Term1), in the second term (Term2), the picking system 1 executes the sorting process (Ast) on the transport conveyers (R2, R4, R6, L1, L3, and L5) belonging to the second conveyer group U2, and executes the replacement process (Rot), the unloading process (Bf-out), and the loading process (Be-in) on the transport conveyers (R1, R3, R5, L2, L4, and L6) belonging to the first conveyer group U1.

That is, in the second term (Term2), the processes executed on the conveyer groups (U1 and U2) in the first term (Term1) are switched and executed on the conveyer group (U1 and U2). Note that the replacement process (Rot), the unloading process (Bf-out), and the loading process (Be-in) for the first conveyer group U1 are executed in the same flow as that of the replacement process (Rot), unloading process (Bf-out), and the loading process (Be-in) executed on the above-described second conveyer group U2, and thus descriptions thereof are omitted.

Then, after the completion of the second term (Term2), in a third term (Term3), the processes executed on the conveyer groups (U1 and U2) in the second term (Term2) are again switched and executed on the conveyer groups (U1 and U2). In this way, in the picking system 1, for each term (Term1, Term2, Term3, . . . ), the processes for the conveyer groups (U1 and U2) are switched and executed. Accordingly, the components including the multi-row sorting device 2 and the transport device 4 can efficiently cooperate with each other and operate, and it is possible to realize high process efficiency of the picking system 1 as a whole.

OTHER EMBODIMENTS (1) The above embodiments have described an example in which each multi-row sorting device 2 includes a plurality of transport carriages 25 including a discharge conveyor 26. However, the present disclosure is not limited to such a configuration. For example, the multi-row sorting device 2 may include a plurality of rows of slat conveyors in which a pushing mechanism is provided at a position corresponding to each exit 21, for example. A multi-row sorting device 2 having any structure can be used so long as the multi-row sorting device 2 sorts an article A into one of a plurality of exits 21, and discharges the article A.

(2) The above embodiments have described, as an example, a configuration in which the multi-column sorting device 2 includes the exits 21 on both sides in the arrangement direction Y, and container supporting devices 3 are disposed on two sides of one multi-column sorting device 2 in the arrangement direction Y. However, the present disclosure is not limited to such a configuration. For example, the multi-column sorting device 2 may include the exits 21 only on one side in the arrangement direction Y, and the container supporting device 3 may be disposed only on the side where the exits 21 are provided.

(3) The above embodiments have described, as an example, a configuration in which the picking system 1 includes a plurality of multi-column sorting devices 2. However, the present disclosure is not limited to such a configuration. For example, the picking system 1 may include only one multi-column sorting device 2.

(4) The above embodiments have described, as an example, a configuration in which the accommodating containers B can be placed and supported on the container supporting portions 32 of the container supporting device 3. However, the present disclosure is not limited to such a configuration. For example, the accommodating containers B may also be configured to be supported while being suspended from the container supporting portions 32 of the container supporting device 3. In this case, the container supporting portions 32 and the accommodating containers B have a configuration suitable for being suspended.

(5) The above embodiments have been mainly described on the assumption of a configuration in which the transfer machine 47 of the stacker crane 45 unloads one full accommodating container Bf and loads one empty accommodating containers Be each time. However, the present disclosure is not limited to such a configuration, and the transfer machine 47 may also be configured to unload a plurality of full accommodating containers Bf and transfer a plurality of empty accommodating containers Be at the same time.

Figure 15:
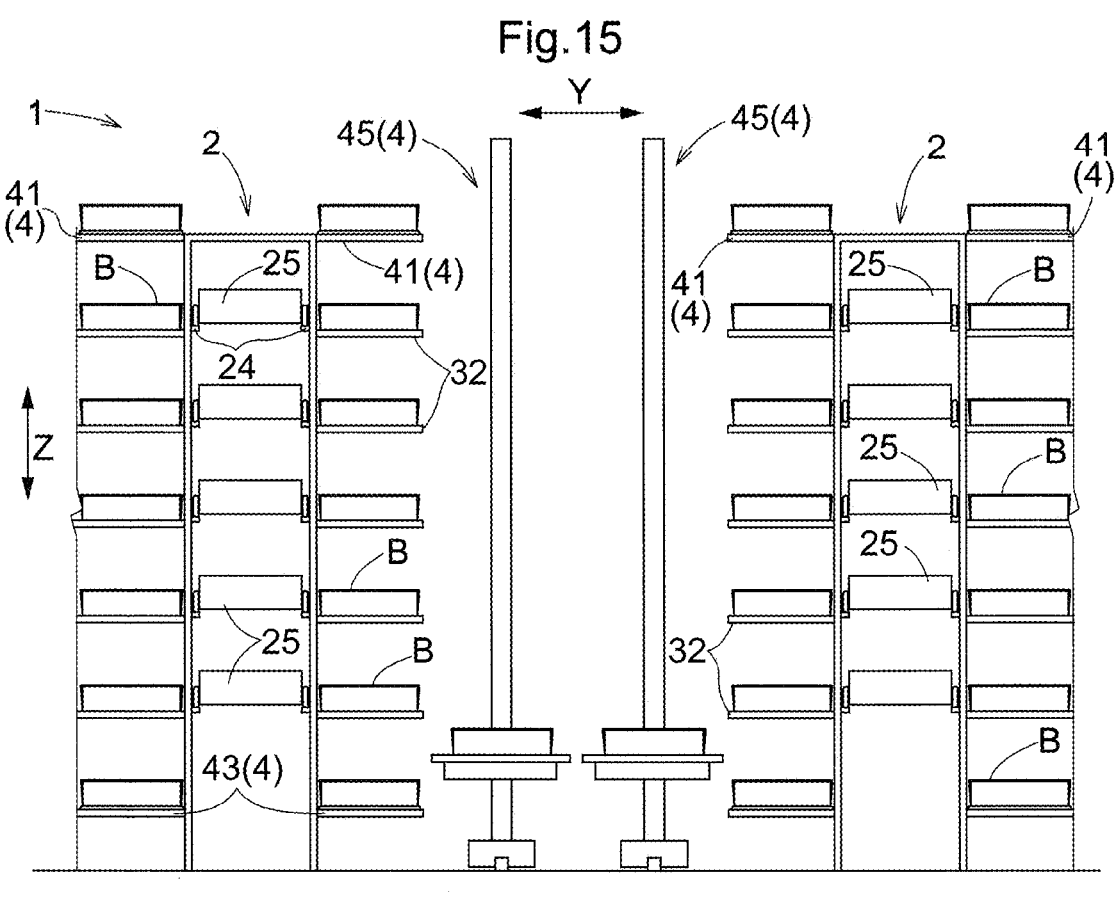
FIG. 15 is a side view of the picking system according to another aspect.

(6) The aforementioned first embodiment has described, as an example, a configuration in which one stacker crane 45 is shared by two multi-row sorting devices 2 adjacent to each other in the arrangement direction Y. However, the present disclosure is not limited to such a configuration. As shown in FIG. 15 for example, each of two multi-row sorting devices 2 adjacent to each other in the arrangement direction Y may have a dedicated stacker crane 45 therebetween. In this case, two dedicated stacker cranes 45 are provided for each multi-row sorting device 2.

(7) The aforementioned first embodiment has described, as an example, a configuration in which the transport device 4 includes the stacker crane 45. However, the present disclosure is not limited to such a configuration. For example, the transport device 4 may also be configured to include the transport carriages that are provided in a plurality of rows that correspond to the respective rows in which the container supporting portions 32 of the container supporting device 3 are provided.

Figure 16:
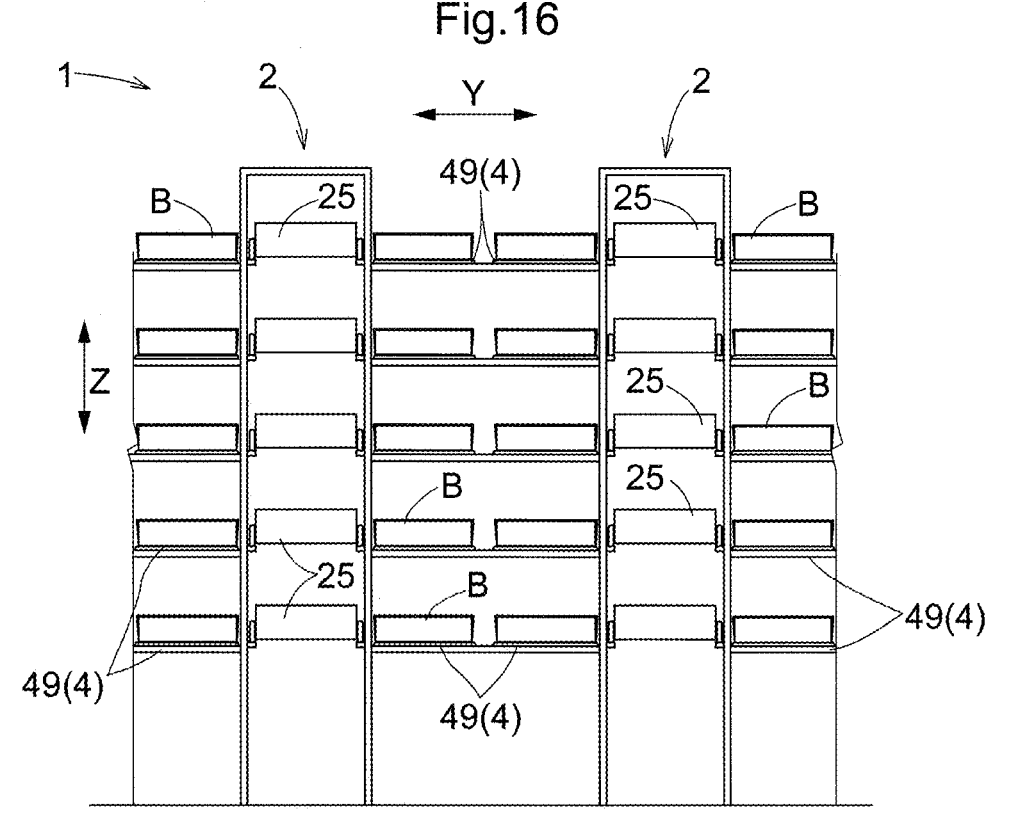
FIG. 16 is a side view of the picking system according to another aspect.

(8) The aforementioned first embodiment has described, as an example, a configuration in which the container supporting device 3 is constituted by the container storage rack 31, and the transport device 4 includes the stacker crane 45 that is separate from the container storage rack 31. However, the present disclosure is not limited to such a configuration. As shown in FIG. 16 for example, part of the container supporting device 3 and part of the transport device 4 may be shared by discharge conveyors 49 provided in a plurality of rows that correspond to the respective rows of exits 21 of the multi-row sorting device 2. Each discharge conveyor 49 receives, in a halted state, an article A discharged from the multi-row sorting device 2 with the accommodating container B placed and supported thereon, and performs, in a driven state, unloading of a full accommodating container Bf and loading of an empty accommodating container Be.

(9) The aforementioned first embodiment has described, as an example, a configuration in which a plurality of accommodating containers B are divided into two sets (the first set of container groups and the second set of container groups) based on the position thereof with respect to the multi-row sorting device 2 in the arrangement direction Y. However, the present disclosure is not limited to such a configuration, and the plurality of accommodating containers B may also be divided into two sets based on, for example, the positions of the container supporting portions 32 of the container supporting device 3 (for example, odd number rows/even number rows, upper side rows/lower side rows with respect to the half, odd number columns/even number columns, right side rows/left side rows with respect to the half, . . . ).

(10) The above-described first embodiment has described, as an example, a configuration in which the same number of orders as the number of exits 21 (the number of rows×the number of columns) of one multi-column sorting device 2 located on one side in the arrangement direction Y are collectively processed in one batch. However, the present disclosure is not limited to such a configuration, and the number of orders that are collectively processed in one batch may be changed as appropriate.

(11) The aforementioned second embodiment has described, as an example, a configuration in which the first transport portion 451 and the second transport portion 452 are formed straight along the width direction X. However, these shapes are not limited to straight shape extending along the width direction X. However, the first transport portion 451 needs to be arranged at a position at which it can receive articles A discharged from the plurality of exits 21 arranged in the respective rows of the multi-row sorting device 2. Accordingly, the shape of the first transport portion 451 preferably corresponds to the arrangement shape of the plurality of exit 21 of the multi-row sorting device 2 in the width direction X. On the other hand, the shape of the second transport portion 452 has a higher degree of freedom than that of the first transport portion 451. For example, even when the first transport portion 451 extends in the width direction X, the second transport portion 452 does not need to extend in the width direction X. Also, the shape of the second transport portion 452 in a plan view may also be a curved shape such as, for example, an arc shape or an S shape.

(12) The aforementioned second embodiment has described, as an example, a configuration in which the transport conveyer 450 includes, in addition to the first transport portion 451, the second transport portion 452, the first connection transport portion 453, and the second connection transport portion 454. However, the present disclosure is not limited to such a configuration, and depending on the shape of the second transport portion 452, a configuration is also possible in which the transport conveyer 450 does not include the first connection transport portion 453 and the second connection transport portion 454, and the first transport portion 451 and the second transport portion 452 are directly connected to each other. Alternatively, the transport conveyer 450 does not necessarily include the second transport portion 452, the first connection transport portion 453, and the second connection transport portion 454. In this case, a configuration is also possible in which the first transport portion 451 and the relay transport device 420 directly give and receive accommodating containers B. For example, a configuration is also possible in which relay transport devices 420 are respectively provided on the two sides of the first transport portion 451 in the width direction X, and one relay transport device 420 (for example, a first relay transport device) transports empty accommodating containers Be to the first transport portion 451, and this first transport portion 451 transports full accommodating containers Bf from the other relay transport device 420 (for example, a second relay transport device). Note however that the present invention is not limited to this, and a configuration is also possible in which a relay transport device 420 is provided only on one side of the first transport portion 451 in the width direction X, and the relay transport device 420 gives empty accommodating containers Be to the first transport portion 451, and receives full accommodating containers Bf from the first transport portion 451.

(13) The aforementioned second embodiment has described, as an example, a configuration in which the relay transport device 420 is disposed between the second transport portion 452 of the transport conveyer 450, and each of the unloading conveyor 430 and the loading conveyor 410, when viewed in the vertical direction. However, the present disclosure is not limited to such a configuration, and a pair of relay transport devices 420 may also be provided for one transport conveyer 450, corresponding to the first transport portion 451 and the second transport portion 452 of the transport conveyer 450. In this case, one relay transport device 420 (for example, the first relay transport device) is disposed between the first transport portion 451 and the loading conveyor 410 when viewed in the vertical direction, and is preferably configured to transport the empty accommodating containers Be given from the loading conveyor 410 to the first transport portion 451. Also, the other relay transport device 420 (for example, the second relay transport device) is disposed between the second transport portion 452 and the unloading conveyor 430 when viewed in the vertical direction, and is preferably configured to transport the full accommodating containers Bf received from the second transport portion 452 to the unloading conveyor 430.

(14) The aforementioned second embodiment has described, as an example, a configuration in which the unloading conveyor 430 and the loading conveyor 410 are disposed so as to overlap each other when viewed in a vertical direction view along the vertical direction Z, and so as to be distanced from each other in the vertical direction Z. However, the present disclosure is not limited to such a configuration, and the unloading conveyor 430 and the loading conveyor 410 may also be disposed so as not to overlap each other when viewed in the vertical direction. In this case, the unloading conveyor 430 and the loading conveyor 410 may be arranged so as to be distanced from each other in the vertical direction Z, or may be arranged at the same positions (at the same height) in the vertical direction Z.

(15) The aforementioned second embodiment has described an example in which the relay transport device 420 is configured to transport accommodating containers B in the vertical direction Z and the width direction X. However, the present disclosure is not limited to such a configuration, and the relay transport device 420 may also be configured to transport accommodating containers B not only in the vertical direction Z and the width direction X, but also in the arrangement direction Y. Alternatively, the relay transport device 420 may be configured as, for example, a conveyer that transports accommodating containers B only in the width direction X, and the number of provided relay transport devices 420 may correspond to the number of transport conveyers 450 disposed in a plurality of rows in the vertical direction Z. In this case, preferably, each of the relay transport devices 420 disposed in a plurality of rows in the vertical direction Z is connected to an unloading/loading conveyer capable of executing both unloading and loading of accommodating containers B, on the side in the width direction X opposite to the transport conveyer 450. The unloading/loading conveyer is configured to be able to transport accommodating containers B toward both sides in the width direction X, and the number of provided unloading/loading conveyers corresponds to the number of relay transport devices 420 disposed in the vertical direction Z in a plurality of rows. Note that the unloading/loading conveyer is connected to, on the side in the width direction X opposite to the relay transport device 420, both a loading line for loading empty accommodating containers Be and an unloading line for unloading full accommodating containers Bf. Note that if the relay transport device 420 is configured as a conveyer, examples of the relay transport device 420 include a spiral conveyer that transports accommodating containers B along a spiral transport path, an inclination changeable conveyer whose inclination angle can be suitably changed, and another well-known conveyer. The number of relay transport devices 420 is suitable set according to the configuration thereof. Note that if an inclination changeable conveyer is used as the relay transport device 420, the inclination changeable conveyer is suitably configured to change the angle such that, for example, when the inclination changeable conveyer is in a state having a first inclination angle, the transport conveyer 450 and the loading conveyor 410 are connected to each other by the inclination changeable conveyer, and when the inclination changeable conveyer is in a state having a second inclination angel, the transport conveyer 450 and the unloading conveyor 430 are connected to each other by the inclination changeable conveyer.

(16) The configurations disclosed in the embodiments described above (including the above-described embodiment and other embodiments; the same applies to the following) are applicable in combination with configurations disclosed in other embodiments so long as no inconsistency arises. With regard to the other configurations as well, the embodiments disclosed herein are in all respects as illustrative, and appropriate changes and modifications may be made thereto without departing from the scope and sprit of the present disclosure.

Outline of the Embodiments

To summarize the foregoing, a picking system according to the present disclosure preferably includes the following configurations.

A picking system that collects and delivers a required article from among a plurality of stored articles, comprising:

a multi-row sorting device that includes a plurality of rows of exits at different heights in a vertical direction, and is configured to sort the article into one of the plurality of rows of exits based on an order, and discharge the sorted article;

a container supporting device that includes a plurality of container supporting portions provided in a plurality of rows respectively corresponding to the plurality of rows of exits, and is capable of supporting an accommodating container that receives and accommodates the article discharged from the exit on the corresponding container supporting portion until an article group that is a set of articles for the order is collected; and a transport device configured to unload the accommodating container in which the article is accommodated from the container supporting portion, and load an empty accommodating container to the container supporting portion.

With this configuration, since the sorting device that sorts an article based on an order is a multi-row sorting device having a plurality of rows of exits, it is possible to increase the number of orders that can be collectively processed at a time, using the rows at different heights in the vertical direction. That is, the process efficiency for sorting can be increased, without expanding the planar installation space for the sorting device. Also, in this configuration, the article discharged from the exit is received in the accommodating container supported on the container supporting portion of the container supporting device until an article group for each corresponding order is collected, and then automatically unloaded by the transport device. As a result of the unloading process, there is no accommodating container on each container supporting portion, and thus an empty accommodating container is automatically loaded by the transport device to compensate for this absence. Accordingly, since unloading of the accommodating container in which the article group for each order is accommodated, and loading of an empty accommodating container are automatically performed by the transport device, it is possible to efficiently perform unloading after sorting, and prepare for the next unloading process. With the above-described measures, it is possible to realize a picking system that can efficiently perform operations from collection to delivery of articles in a limited space.

As one aspect, preferably, the multi-row sorting device includes the exits on two sides in an arrangement direction in which the multi-row sorting device and the container supporting device are arranged side by side, and the container supporting device and the transport device are disposed on each of the two sides of the multi-row sorting device in the arrangement direction.

With this configuration, the number of orders that can be collectively processed at a time can be doubled, relative to a configuration in which the multi-row sorting device has exits only on one side and discharges articles only to one side.

As one aspect, preferably, a plurality of the multi-row sorting devices are provided along the arrangement direction, and the transport device that is located between two multi-row sorting devices adjacent to each other in the arrangement direction is configured to perform both unloading of an accommodating container from one multi-row sorting device side, and unloading of an accommodating container from the other multi-row sorting device side.

With this configuration, it is possible to realize space saving and a reduction in cost since one transport device is shared by two multi-row sorting devices, compared to a configuration in which dedicated transport devices are respectively arranged between two multi-row sorting devices adjacent to each other in the arrangement direction.

As one aspect, preferably, the transport device includes a stacker crane that includes: a transfer machine configured to receive the accommodating container from the container supporting portion and give the accommodating container to the container supporting portion; and a moving device configured to move the transfer machine between a plurality of container supporting portions.

With this configuration, with the moving device capable of moving up and down, and the transfer machine that are included in the stacker crane, it is possible to unload, using the common stacker crane, a plurality of rows of accommodating containers supported on the plurality of rows of the container supporting device. Also, it is possible to load, using the common stacker crane, empty accommodating containers to the plurality of rows of container supporting portions of the container supporting device. Accordingly, it is possible to simplify the configuration of the transport device, compared to a configuration in which, for example, the transport device includes a plurality of rows of conveyers.

As one aspect, preferably, the transport device includes an unloading conveyor configured to receive and unload the accommodating container in which the article is accommodated from the stacker crane, and a loading conveyor configured to load and give the empty accommodating container to the stacker crane, and the unloading conveyor and the loading conveyor are respectively disposed at positions at which the unloading conveyor and the loading conveyor overlap the container supporting device when viewed in the vertical direction.

With this configuration, the unloading conveyor can be used to unload an accommodating container in which an article is accommodated from a position at which it overlaps the container supporting device when viewed in the vertical direction, and the loading conveyor can be used to load an empty accommodating container to a position at which it overlaps the container supporting device when viewed in the vertical direction. Accordingly, it is possible to perform unloading and loading of the accommodating containers using the stacker crane with a short distance. Accordingly, in the configuration in which the transport device includes the stacker crane, it is possible to efficiently perform unloading after sorting, and prepare for the next unloading. At this time, since the unloading conveyor and the loading conveyor can be disposed using spaces above and below the container supporting device, it is possible to suppress planar installation space of the system as a whole.

As one aspect, preferably, when it is assumed that a direction that intersects with the vertical direction when viewed in an arrangement direction view along the arrangement direction, in which the multi-row sorting device and the container supporting device are arranged side by side, is defined as a width direction, the multi-row sorting device includes a plurality of columns of exits at different positions in the width direction, the transport device includes a transport conveyer, the transport conveyer includes a supporting face capable of supporting the same number of accommodating containers as the number of the plurality of columns of exits that are aligned in the width direction, and is configured to transport the plurality of accommodating containers supported on the supporting face along the width direction, the supporting face also serves as the container supporting portions, and the transport conveyer also serves as the container supporting device.

With this configuration, the transport conveyer serving also as the transport device and as the container supporting device can support and transport the accommodating containers. Accordingly, it is possible to realize simplification and space-saving of the configuration of the system as a whole, compared to a case where the transport device and the container supporting device that are separate from each other are provided. Also, with the present configuration, the same number of aligned accommodating containers as the number of the plurality of columns of exits can be collectively supported on the supporting face of the transport conveyer serving as the container supporting portions, and can be transported collectively along the width direction. Thus, it is possible to increase the transport efficiency of the accommodating container.

As one aspect, preferably, the transport conveyer includes, in addition to a first transport portion that has the supporting face, a second transport portion configured to support and transport the same number of accommodating containers as the number of the accommodating containers supported on the supporting face, a first connection transport portion that connects a first end portion of the first transport portion and a first end portion of the second transport portion, and a second connection transport portion that connects a second end portion of the first transport portion and a second end portion of the second transport portion.

With this configuration, the first transport portion and the second transport portion can each support the same number of accommodating containers, and are also connected to each other by the first connection transport portion and the second connection transport portion. Accordingly, for example, in a state in which the first transport portion supports a plurality of accommodating containers (full accommodating containers) in which an article is accommodated, and the second transport portion supports the same number of empty accommodating containers (empty accommodating containers) in which no article is accommodated as the number of container supported on the first transport portion, the full accommodating containers and the empty accommodating containers can be replaced between the first transport portion and the second transport portion. Accordingly, it is possible to shorten the time period in which the article sorting operation is halted for waiting for the replacement of the full accommodating containers and the empty accommodating containers. Thus, with the present configuration, it is possible to increase the process efficiency of the system as a whole.

As one aspect, preferably, the transport device includes a relay transport device, an unloading conveyor configured to receive and unload the accommodating container in which the article is accommodated from the transport conveyer via the relay transport device, and a loading conveyor configured to load the empty accommodating container to the transport conveyer via the relay transport device, the unloading conveyor and the loading conveyor are disposed so as to overlap each other when viewed in a vertical direction view along the vertical direction, and so as to be distanced from each other in the vertical direction, and the relay transport device transports the accommodating containers in the vertical direction.

With this configuration, since the unloading conveyor for unloading an accommodating container and the loading conveyor for loading an accommodating container are disposed so as to overlap each other when viewed in the vertical direction view, and so as to be distanced from each other in the vertical direction, it is possible to reduce the floor area occupied by the system overall. Also, even in such a configuration in which the unloading conveyor and the loading conveyor are distanced from each other in the vertical direction, the relay transport device is configured to transport the accommodating containers in the vertical direction, and thus the accommodating containers can be transported appropriately between each of the unloading conveyor and the loading conveyor, and the transport conveyer.

As one aspect, preferably, a plurality of the accommodating containers that receive the article from the multi-row sorting device include a first set of container groups, which is a set of accommodating containers that belong to a first set, and a second set of container groups, which is a set of accommodating containers that belong to a second set, while the transport device performs unloading and loading of the accommodating containers belonging to the first set of container groups, the multi-row sorting device discharges the articles to the accommodating containers belonging to the second set of container groups, and while the transport device performs unloading and loading of the accommodating containers belonging to the second set of container groups, the multi-row sorting device discharges the articles to the accommodating containers belonging to the first set of container groups.

With this configuration, unloading and loading processes for the accommodating containers belonging to either of the first set of container groups and the second set of container groups, and sorting (discharging articles from the multi-row sorting device) for the accommodating containers belonging to the other set can be executed in a temporarily overlapping manner. Then, these operations are executed alternately for the first set of container groups and the second set of container groups, and thereby it is possible to improve the process efficiency of the picking system as a whole.

As one aspect, preferably, an automatic warehouse that stores the articles is further provided, a plurality of the multi-row sorting devices are provided, and the plurality of multi-row sorting devices are connected in common to the automatic warehouse, and the articles included in orders that correspond to the plurality of multi-row sorting devices are supplied in an aggregated manner for each type from the automatic warehouse side, and then a required number of articles are distributed to each of the multi-row sorting devices.

With this configuration, it is possible to reduce the operation amount of the automatic warehouse, compared to a configuration in which articles included in orders are sequentially supplied from the automatic warehouse side to the individual multi-row sorting devices. Accordingly, it is possible to smoothly supply articles from the automatic warehouse to the plurality of multi-row sorting devices. Also, it is possible to increase the process efficiency of the system as a whole.

It is sufficient that the picking system according to the present disclosure can achieve at least one of the above-described effects.

DESCRIPTION OF REFERENCE SIGNS

1 Picking system
2 Multi-row sorting device
3 Container supporting device
4 Transport device
21 Exit
31 Container storage rack
32 Container supporting portion
41 Loading conveyor
43 Unloading conveyor
45 Stacker crane
46 Moving device
47 Transfer machine
A Article
G Article group
B Accommodating container
Bf Full accommodating container
Be Empty accommodating container
Y Arrangement direction
Z Vertical direction

The invention claimed is:

1. A picking system that collects and delivers a required article from among a plurality of stored articles, comprising:

a multi-row sorting device comprising a plurality of rows of exits at different heights in a vertical direction, and is configured to sort the article into one of the plurality of rows of exits based on an order, and discharge the sorted article;

a container supporting device comprising a plurality of container supporting portions provided in a plurality of rows respectively corresponding to the plurality of rows of exits, and is capable of supporting an accommodating container that receives and accommodates the article discharged from the exit on the corresponding container supporting portion until an article group that is a set of articles for the order is collected; and a transport device configured to unload the accommodating container in which the article is accommodated from the container supporting portion, and load an empty accommodating container to the container supporting portion, wherein a direction that intersects with the vertical direction when viewed in an arrangement direction view along the arrangement direction in which the multi-row sorting device and the container supporting device are arranged side by side is defined as a width direction, wherein the multi-row sorting device comprises a plurality of columns of exits disposed for each of the plurality of rows and at different positions in the width direction and at least one transport carriage configured to travel along the width direction, and wherein the at least one transport carriage is configured to discharge the article to each of the plurality of rows and the plurality of columns of exits.

2. The picking system according to claim 1, wherein the multi-row sorting device includes the exits on two sides in an arrangement direction in which the multi-row sorting device and the container supporting device are arranged side by side, and wherein the container supporting device and the transport device are disposed on each of the two sides of the multi-row sorting device in the arrangement direction.

3. The picking system according to claim 2, wherein a plurality of the multi-row sorting devices are provided along the arrangement direction, and wherein the transport device that is located between two multi-row sorting devices adjacent to each other in the arrangement direction is configured to perform both unloading of an accommodating container from one multi-row sorting device side, and unloading of an accommodating container from the other multi-row sorting device side.

4. The picking system according to claim 1, wherein the transport device comprises a stacker crane comprising:

a transfer machine configured to receive the accommodating container from the container supporting portion and give the accommodating container to the container supporting portion; and a moving device configured to move the transfer machine between a plurality of container supporting portions.

5. The picking system according to claim 4, wherein the transport device comprises an unloading conveyor configured to receive and unload the accommodating container in which the article is accommodated from the stacker crane, and a loading conveyor configured to load and give the empty accommodating container to the stacker crane, and wherein the unloading conveyor and the loading conveyor are respectively disposed at positions at which the unloading conveyor and the loading conveyor overlap the container supporting device when viewed in the vertical direction.

6. The picking system according to claim 1, wherein the transport device comprises a transport conveyer, wherein the transport conveyer comprises a supporting face capable of supporting the same number of accommodating containers as the number of the plurality of columns of exits that are aligned in the width direction, and is configured to transport the plurality of accommodating containers supported on the supporting face along the width direction, wherein the supporting face also serves as the container supporting portions, and wherein the transport conveyer also serves as the container supporting device.

7. The picking system according to claim 6, wherein the transport conveyer comprises, in addition to a first transport portion that has the supporting face, a second transport portion configured to support and transport the same number of accommodating containers as the number of the accommodating containers supported on the supporting face, a first connection transport portion that connects a first end portion of the first transport portion and a first end portion of the second transport portion, and a second connection transport portion that connects a second end portion of the first transport portion and a second end portion of the second transport portion.

8. The picking system according to claim 6, wherein the transport device comprises a relay transport device, an unloading conveyor configured to receive and unload the accommodating container in which the article is accommodated from the transport conveyer via the relay transport device, and a loading conveyor configured to load the empty accommodating container to the transport conveyer via the relay transport device, wherein the unloading conveyor and the loading conveyor are disposed so as to overlap each other when viewed in a vertical direction view along the vertical direction, and so as to be distanced from each other in the vertical direction, and wherein the relay transport device transports the accommodating containers in the vertical direction.

9. The picking system according to claim 1, wherein a plurality of the accommodating containers that receive the article from the multi-row sorting device comprises a first set of container groups, which is a set of accommodating containers that belong to a first set, and a second set of container groups, which is a set of accommodating containers that belong to a second set, wherein while the transport device performs unloading and loading of the accommodating containers belonging to the first set of container groups, the multi-row sorting device discharges the articles to the accommodating containers belonging to the second set of container groups, and wherein while the transport device performs unloading and loading of the accommodating containers belonging to the second set of container groups, the multi-row sorting device discharges the articles to the accommodating containers belonging to the first set of container groups.

10. The picking system according to claim 1, wherein an automatic warehouse that stores the articles is provided, wherein a plurality of the multi-row sorting devices are provided, and the plurality of multi-row sorting devices are connected in common to the automatic warehouse, and wherein the articles included in orders that correspond to the plurality of multi-row sorting devices are supplied in an aggregated manner for each type from the automatic warehouse side, and then a required number of articles are distributed to each of the multi-row sorting devices.

11. The picking system according to claim 2, wherein the transport device comprises a stacker crane comprising:

a transfer machine configured to receive the accommodating container from the container supporting portion and give the accommodating container to the container supporting portion; and a moving device configured to move the transfer machine between a plurality of container supporting portions.

12. The picking system according to claim 3, wherein the transport device comprises a stacker crane comprising:

a transfer machine configured to receive the accommodating container from the container supporting portion and give the accommodating container to the container supporting portion; and a moving device configured to move the transfer machine between a plurality of container supporting portions.

13. The picking system according to claim 2, wherein:

the transport device comprises a transport conveyer, the transport conveyer comprises a supporting face capable of supporting the same number of accommodating containers as the number of the plurality of columns of exits that are aligned in the width direction, and is configured to transport the plurality of accommodating containers supported on the supporting face along the width direction, the supporting face also serves as the container supporting portions, and the transport conveyer also serves as the container supporting device.

14. The picking system according to claim 7, wherein the transport device comprises a relay transport device, an unloading conveyor configured to receive and unload the accommodating container in which the article is accommodated from the transport conveyer via the relay transport device, and a loading conveyor configured to load the empty accommodating container to the transport conveyer via the relay transport device, wherein the unloading conveyor and the loading conveyor are disposed so as to overlap each other when viewed in a vertical direction view along the vertical direction, and so as to be distanced from each other in the vertical direction, and wherein the relay transport device transports the accommodating containers in the vertical direction.

15. The picking system according to claim 1, further comprising:

a plurality of rails laid for each of the plurality of rows of exits and along the width direction, and wherein the at least one transport carriage comprises a plurality of transport carriages corresponding to the rails in the plurality of rows and configured to travel on the rails.

\*   \*   \*   \*   \*